(12) United States Patent
You et al.

(10) Patent No.: US 11,778,458 B2
(45) Date of Patent: Oct. 3, 2023

(54) NETWORK ACCESS AUTHENTICATION METHOD AND DEVICE

(71) Applicant: ZTE Corporation, Guangdong (CN)

(72) Inventors: Shilin You, Guangdong (CN); Hongjun Liu, Guangdong (CN); Jiyan Cai, Guangdong (CN); Zaifeng Zong, Guangdong (CN); Jin Peng, Guangdong (CN); Zhaoji Lin, Guangdong (CN); Yunyin Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/826,914

(22) Filed: May 27, 2022

(65) Prior Publication Data

US 2022/0295269 A1    Sep. 15, 2022

Related U.S. Application Data

(63) Continuation of application No. 16/332,682, filed as application No. PCT/CN2017/094402 on Jul. 25, 2017, now Pat. No. 11,368,841.

(30) Foreign Application Priority Data

Sep. 12, 2016  (CN) .......................... 201610821578.2

(51) Int. Cl.
*G06F 7/04*     (2006.01)
*H04W 12/03*    (2021.01)
(Continued)

(52) U.S. Cl.
CPC ........... *H04W 12/03* (2021.01); *H04W 12/02* (2013.01); *H04W 12/06* (2013.01);
(Continued)

(58) Field of Classification Search
CPC ..... H04W 12/03; H04W 12/72; H04W 12/75; H04W 12/069; H04W 12/06; H04W 12/08
(Continued)

(56) References Cited

U.S. PATENT DOCUMENTS 8,245,039 B2   8/2012  Jones
8,275,355 B2   9/2012  Huang et al.
(Continued)

FOREIGN PATENT DOCUMENTS

CN     1649435 A     8/2005
CN     1859731 A    11/2006
(Continued)

OTHER PUBLICATIONS

International Search Report and Written Opinion dated Sep. 29, 2017 for International Application No. PCT/CN2017/094402, filed on Jul. 25, 2017 (6 pages).
(Continued)

*Primary Examiner* — Jeffrey C Pwu
*Assistant Examiner* — Samuel Ambaye
(74) *Attorney, Agent, or Firm* — Perkins Coie LLP

(57) ABSTRACT

Embodiments of the prevent invention provide a network access authentication method and device. The method comprises: receiving an authentication request message sent by a first serving network, wherein the authentication request message carries a user equipment pseudonym identifier generated by a user equipment; determining whether a local user equipment pseudonym identifier is asynchronous with the user equipment pseudonym identifier generated by the user equipment; and obtaining, if the determination result is yes, an encrypted international mobile subscriber identity (IMSI) to carry out network access authentication on the user equipment. The embodiments of the present invention
(Continued)

can solve the problem that a network access process in the related art does not provide a processing method for the case where the user equipment pseudonym identifier in the user equipment is asynchronous with the user equipment pseudonym identifier in a home network.

9 Claims, 11 Drawing Sheets

(51) Int. Cl.
  *H04W 12/02* (2009.01)
  *H04W 12/069* (2021.01)
  *H04W 12/75* (2021.01)
  *H04W 12/72* (2021.01)
  *H04W 12/06* (2021.01)
  *H04W 12/08* (2021.01)
  *H04L 101/654* (2022.01)

(52) U.S. Cl.
  CPC ......... *H04W 12/069* (2021.01); *H04W 12/08* (2013.01); *H04W 12/72* (2021.01); *H04W 12/75* (2021.01); *H04L 2101/654* (2022.05)

(58) Field of Classification Search
  USPC .......................................................... 726/2
  See application file for complete search history.

(56) References Cited

U.S. PATENT DOCUMENTS

| | | | | |
|---|---|---|---|---|
| 8,286,227 | B1 * | 10/2012 | Zheng ................ | G06Q 20/3823 |
| | | | | 726/5 |
| 9,544,711 | B2 | 1/2017 | Kim et al. | |
| 2011/0277028 | A1 | 11/2011 | Piazza et al. | |
| 2013/0039287 | A1 * | 2/2013 | Rayavarapu .......... | H04W 76/28 |
| | | | | 370/329 |
| 2013/0170643 | A1 | 7/2013 | Xiao et al. | |
| 2015/0156093 | A1 * | 6/2015 | Li ........................ | H04W 24/04 |
| | | | | 714/37 |
| 2019/0007376 | A1 * | 1/2019 | Norrman ............. | H04L 63/0876 |

FOREIGN PATENT DOCUMENTS

| | | |
|---|---|---|
| CN | 101360323 A | 2/2009 |
| CN | 101400054 A | 4/2009 |
| CN | 101552959 A | 10/2009 |
| CN | 101720086 A | 6/2010 |
| CN | 101730171 A | 6/2010 |
| CN | 102131188 A | 7/2011 |
| CN | 102421083 A | 4/2012 |
| CN | 101771992 B | 6/2012 |
| CN | 102857897 A | 1/2013 |
| EP | 1991014 A1 | 11/2008 |
| WO | 2014065492 A1 | 5/2014 |

OTHER PUBLICATIONS

Ericsson, et al., "New privacy solution on enhancing the concealment of permanent of long-term subscriber identifier," 3GPP TSG-SA WG3 Meeting #84, S3-160995, Chennai, India, Jul. 25-29, 2016, 3 pages.

Norrman, et al., "Protecting IMSI and User Privacy in 5G Networks," Proceedings of the 9th EAI International Conference on Mobile Multimedia Communications, May 30, 2016, XP055570638, 8 pages.

"3rd Generation Partnership Project; Technical Specification Group Services and System Aspects; Study on the security aspects of the next generation system (Release 14)," 3GPP TR 33.899, V0.4.1, Aug. 2016, 156 pages.

"3rd Generation Partnership Project; Technical Specification Group Core Network and Terminals; Non-Access-Stratum (NAS) protocol for Evolved Packet System (EPS); Stage 3 (Release 13)," 3GPP TS 24.301, V13.6.1, Jun. 2016, 452 pages.

European Search Report for EP Patent Application No. 17848015.8, dated Aug. 19, 2020, 25 pages.

European Search Report for EP Patent Application No. 20197709.7, dated Apr. 23, 2021, 15 pages.

Ericsson, et al., "Updating solution #7.3," 3GPP TSG-SA3 Meeting #85, S3-161853, Santa Cruz de Tenerife, Spain, Nov. 7-11, 2016, 6 pages.

Chinese office action issued in CN Patent Application No. 202111165035.7, dated Apr. 1, 2023, 15 pages. English translation included.

Chinese office action issued in CN Patent Application No. 202111165035.7, dated Nov. 14, 2022, 14 pages. English translation included.

Chinese office action issued in CN Patent Application No. 202111165035.7, dated May 31, 2022, 9 pages. English translation included.

Samsung et al., "Refactoring Security Parameters for Maintainability," 3GPP TSG SA WG2 Meeting #76, S2-096922 (S2-096200_R5), Nov. 16-20, 2009, San Jose Del Cabo, Mexico, 47 pages.

Chinese office action issued in CN Patent Application No. 201610821578.2, dated Oct. 12, 2020, 11 pages. English translation included.

Chinese office action issued in CN Patent Application No. 202111165035.7, dated Jun. 30, 2023, 13 pages. English translation included.

European Communication pursuant to Article 94(3) EPC issued in EP Patent Application No. 20197709.7, dated Jul. 25, 2023, 7 pages.

* cited by examiner

NETWORK ACCESS AUTHENTICATION METHOD AND DEVICE

CROSS-REFERENCE TO RELATED APPLICATIONS

This application is a continuation of U.S. patent application Ser. No. 16/332,682, filed on Jan. 8, 2020, which is a U.S. National Stage Application, under 35 U.S.C. 371, of International Patent Application No. PCT/CN2017/094402, filed on Jul. 25, 2017, which claims priority to Chinese Patent Application No. 201610821578.2, filed on Sep. 12, 2016, the contents of each of which are incorporated herein by reference in their entireties.

TECHNICAL FIELD

Embodiments of the present disclosure relate to the technical field of communication, and in particular, to a network access authentication method and a network access authentication device.

BACKGROUND

Mobile communication has developed rapidly in more than 20 years, which has brought huge impacts on people's lifestyle, production, social and political, and economic aspects. Human society has entered an era of efficient information, and the demand for traffic applications in all aspects has been explosively increased. This will bring huge challenges to the future wireless mobile bandwidth system in terms of frequency, technology and operation.

In addition to providing services for person-to-person communication, the future mobile network will provide access services for more and more Internet of Things terminals. Internet of Things access brings new challenges and opportunities to mobile networks.

Different types of Internet of Things have different requirements for the networks. Some require networks to provide high real-time and high-reliability services, such as telemedicine, while others require regular small data transmission services, such as remote meter reading systems. For different traffic demands, mobile networks may need to be properly optimized to meet the traffic demands. More Internet of Things puts more different optimization requirements on mobile networks. Some of the optimization requirements may be contradictory to each other. Therefore, a converged core network may become unable to meet various demands of the Internet of Things.

With the continuous upgrading of networks, 5G technology appears, and the privacy protection requirements for the network are getting increasingly higher. FIG. 1 is a schematic diagram of future 5G network access in related art. As shown in FIG. 1, user equipment completes initial registration in a serving network 1, and the serving network 1 obtains an authentication vector and user subscription data from a home network of the user equipment. The serving network 1 completes mutual authentication with the user equipment, and then the user equipment can attach to the serving network 2 for related data traffic. The serving network 1 and the serving network 2 include an access network and a core network, and the home network includes a user data center/authentication center.

FIG. 2 is a schematic diagram of a process for protecting a user privacy with International Mobile Subscriber Identification Number (IMSI) when a user equipment accesses a serving network 1 in the related art. The IMSI is stored in a SIM card and can be used to distinguish effective information of a mobile subscriber, and has a total length no more than 15 digits of numbers from 0 to 9. The IMSI includes a Mobile Country Code (MCC) indicating the mobile subscriber's country code, which is of 3 digits. The MCC of China is 460. The Mobile Network Code (MNC) is the mobile network number, which consists of two or three digits (China Mobile's MNC is 00) for identifying the mobile communication network to which the mobile subscriber belongs; and a Mobile Subscriber Identification Number (MSIN) for identifying a certain mobile user in the communication network. The steps are as follows.

In step S201, the user equipment partially encrypts the IMSI with a public key Kimsi. The security method is that the original MCC and the MNC are kept unchanged, and only the MSIN is encrypted. That is, the encrypted IMSI=MCC+MNC+ encryption function (MSIN, Kimsi), where the public key is the public key of the home network Kimsi.

In step S202, the user equipment sends an initial attach request message to the serving network 1. The message carries an encrypted IMSI.

In step S203, the serving network 1 searches for the home network of the user equipment according to the MCC and the MNC in the encrypted IMSI, and sends an authentication request message to the home network. The message carries the encrypted IMSI.

In step S204, the home network decrypts the encrypted IMSI with the private key paired with the public key to obtain the decrypted IMSI, and identifies the user corresponding to the encrypted IMSI.

In step S205, the home network sends an authentication request response message to the serving network 1. The message carries a user security context, i.e., a security vector set.

In step S206, the home network uses a key K1 that is known to the user equipment to generate a user equipment alias identifier corresponding to the user equipment. The user equipment alias identifier is used to replace the IMSI or the encrypted IMSI, so that the serving network 1 can identify the home network corresponding to the user equipment according to the user equipment alias identifier in the subsequent processing.

In step S207, the serving network 1 sends a user authentication request message to the user equipment. The message carries an authentication token AUTN and a random number RAND. The user equipment verifies the validity of the network with the authentication token, and calculates an expected response value XRES by using RAND.

In step S208, the user equipment sends back a user authentication request response message to the serving network 1. The message carries the expected response value XRES. The serving network 1 compares the expected response value in the security context with the received expected response value, and if they are equal to each other, the serving network 1 authenticates the user equipment as valid.

In step S209, the user equipment generates a user equipment alias identifier with K1. The user equipment alias identifier is used to replace the IMSI or the encrypted IMSI, so that the serving network 1 can identify the home network corresponding to the user equipment according to the user equipment alias identifier in the subsequent processing.

In step S210, the serving network 1 sends a location update request message to the home network. The message carries an encrypted IMSI.

In step S211, the home network sends a location update request response message to the serving network 1. The message carries user subscription data and the user equipment alias identifier.

In step S212, the serving network 1 allocates a temporary identifier to the user equipment. The temporary identifier includes a network identifier of the serving network, a device identifier of the serving network, and a temporary code allocated to the user equipment. The serving network 1 feeds back an attach success response message to the user equipment, and the message carries the temporary identifier.

In step S213, if the user equipment alias identifier in the user equipment is synchronized with the user equipment alias identifier in the home network, the user equipment communicates with the serving network 1 or the serving network 2 with the user equipment alias identifier; otherwise, the user equipment communicates with the serving network 1 or the serving network 2 with the encrypted IMSI.

However, the network access process in the related art does not define how to proceed when the user equipment alias identifier in the user equipment is asynchronous with the user equipment alias identifier in the home network.

SUMMARY

Embodiments of the present disclosure provide a network access authentication method and a network access authentication device, so as to solve at least the problem that the network access process of the related art does not define how to proceed when the user equipment alias identifier in the user equipment is asynchronous with the user equipment alias identifier in the home network.

According to one aspect of the present disclosure, there is provided a network access authentication method, including: receiving an authentication request message sent by a first serving network, the authentication request message carrying a user equipment alias identifier generated by user equipment; determining whether a local user equipment alias identifier is asynchronous with the user equipment alias identifier generated by the user equipment; and when the determination result is positive, obtaining an encrypted International Mobile Subscriber Identification Number IMSI for performing network access authentication on the user equipment.

In an embodiment of the present disclosure, obtaining an encrypted International Mobile Subscriber Identification Number IMSI for performing network access authentication on the user equipment includes: sending a first authentication failure message to the first serving network, wherein the first authentication failure message carries a reason value for the asynchronousness of the user equipment alias identifier, and the reason value for the asynchronousness of the user equipment alias identifier is used for notifying the user equipment to resend an attach request carrying an encrypted IMSI to the first serving network according to the reason value for the asynchronousness of the user equipment alias identifier; and obtaining the encrypted IMSI according to the attach request to perform network access authentication on the user equipment.

In an embodiment of the present disclosure, obtaining an encrypted International Mobile Subscriber Identification Number IMSI for performing network access authentication on the user equipment includes: sending a second authentication failure message to the first serving network; receiving an authentication request message carrying an encrypted IMSI re-sent by the first serving network according to the second authentication failure message; and obtaining the encrypted IMSI according to the authentication request message to perform network access authentication on the user equipment.

In an embodiment of the present disclosure, obtaining an encrypted International Mobile Subscriber Identification Number IMSI for performing network access authentication on the user equipment includes: sending a request message to obtain an encrypted IMSI to the first serving network; obtaining the encrypted IMSI according to a response message of the request message; and decrypting the encrypted IMSI, feeding back an authentication response message to the first serving network, wherein the authentication response message carries a user security context, and the user security context is used for performing network access authentication on the user equipment.

In an embodiment of the present disclosure, before receiving the authentication request message sent by the first serving network, the method further includes: receiving an encrypted IMSI sent by a second serving network; and after determining that the user equipment corresponding to the encrypted IMSI is valid, generating an alias index corresponding to a user equipment alias identifier to be used; and sending the alias index to the second serving network, so as to notify the user equipment to generate a user equipment alias identifier according to the alias index.

According to another aspect of the present disclosure, there is provided a network access authentication method, including: sending an authentication request (Authentication_Authenticate) message to a home network, the authentication request message carrying a user equipment alias identifier generated by user equipment;

according to a feedback of the home network, determining that a user equipment alias identifier in the home network is asynchronous with the user equipment alias identifier generated by the user equipment; and obtaining an encrypted International Mobile Subscriber Identification Number IMSI, and sending the encrypted IMSI to the home network, so that the home network performs network access authentication on the user equipment.

In an embodiment of the present disclosure, obtaining an encrypted IMSI and sending the encrypted IMSI to the home network, so that the home network performs network access authentication on the user equipment includes: receiving a first authentication failure message sent by the home network, wherein the first authentication failure message carries a reason value for the asynchronousness of the user equipment alias identifier; sending an attach failure message carrying the reason value for the asynchronousness of the user equipment alias identifier to the user equipment, to notify the user equipment to resend an attach request carrying an encrypted IMSI to the first serving network according to the reason value for the asynchronousness of the user equipment alias identifier; and obtaining the encrypted IMSI according to the attach request, and sending the encrypted IMSI to the home network, so that the home network performs network access authentication on the user equipment.

In an embodiment of the present disclosure, obtaining an encrypted IMSI and sending the encrypted IMSI to the home network, so that the home network performs network access authentication on the user equipment includes: receiving a second authentication failure message sent by the home network; sending a user equipment identifier request message to the user equipment according to the second authentication failure message; and obtaining the encrypted IMSI according to a response of the user equipment, resending an authentication request message carrying an encrypted IMSI to the home network, so that the home network performs network access authentication on the user equipment.

In an embodiment of the present disclosure, obtaining an encrypted IMSI and sending the encrypted IMSI to the home network, so that the home network performs network access authentication on the user equipment includes: receiving a request message to obtain an encrypted IMSI sent by the home network; sending a user equipment identifier request message to the user equipment according to the request message; and obtaining the encrypted IMSI according to a response of the user equipment, and sending the encrypted IMSI to the home network, so that the home network performs network access authentication on the user equipment.

In an embodiment of the present disclosure, before sending an authentication request message to the home network, the method further includes: receiving an attach request sent by the user equipment, the attach request carrying a temporary identifier; obtaining a user security context from a second serving network according to the temporary identifier; sending a request message for obtaining the encrypted IMSI or a user equipment alias identifier to the user equipment when obtaining of the user security context fails; and obtaining the encrypted IMSI or the user equipment alias identifier according to the message to perform network access authentication on the user equipment.

According to yet another aspect of the present disclosure, there is provided a network access authentication device, including: a first receiving module configured to receive an authentication request message sent by a first serving network, the authentication request message carrying a user equipment alias identifier generated by user equipment; a determining module configured to determine whether a local user equipment alias identifier is asynchronous with a user equipment alias identifier generated by the user equipment; and a first obtaining module configured to, when the determination result is positive, obtain an encrypted International Mobile Subscriber Identification Number IMSI for performing network access authentication on the user equipment.

In an embodiment of the present disclosure, the first obtaining module is further configured to send a first authentication failure message to the first serving network, wherein the first authentication failure message carries a reason value for the asynchronousness of the user equipment alias identifier, and the reason value for the asynchronousness of the user equipment alias identifier is used for notifying the user equipment to resend an attach request carrying an encrypted IMSI to the first serving network according to the reason value for the asynchronousness of the user equipment alias identifier; obtain the encrypted IMSI according to the attach request, and perform network access authentication on the user equipment.

In an embodiment of the present disclosure, the first obtaining module is configured to send a second authentication failure message to the first serving network; receive an authentication request message carrying an encrypted IMSI re-sent by the first serving network according to the second authentication failure message; and obtain the encrypted IMSI according to the authentication request message to perform network access authentication on the user equipment.

In an embodiment of the present disclosure, the first obtaining module is configured to send a request message to obtain an encrypted IMSI to the first serving network; obtain the encrypted IMSI according to a response message of the request message; decrypt the encrypted IMSI, feed back an authentication response message to the first serving network, wherein the authentication response message carries a user security context, and the user security context is used for performing network access authentication on the user equipment.

In an embodiment of the present disclosure, the device further includes: a second receiving module configured to receive an encrypted IMSI sent by a second serving network; a generating module configured to, after it is determined that the user equipment corresponding to the encrypted IMSI is valid, generate an alias index corresponding to a user equipment alias identifier to be used; and a first sending module configured to send the alias index to the second serving network, so as to notify the user equipment to generate a user equipment alias identifier according to the alias index.

According to yet another aspect of the present disclosure, there is provided a network access authentication device, including: a second sending module configured to send an authentication request message to a home network, the authentication request message carrying a user equipment alias identifier generated by user equipment; a determining module configured to determine, according to a feedback of the home network, that a user equipment alias identifier in the home network is asynchronous with the user equipment alias identifier generated by the user equipment; and a second obtaining module configured to obtain an encrypted International Mobile Subscriber Identification Number IMSI, and send the encrypted IMSI to the home network, so that the home network performs network access authentication on the user equipment.

In an embodiment of the present disclosure, the second obtaining module is further configured to receive a first authentication failure message sent by the home network, wherein the first authentication failure message carries a reason value for the asynchronousness of the user equipment alias identifier; and send an attach failure message carrying the reason value for the asynchronousness of the user equipment alias identifier to the user equipment, to notify the user equipment to resend an attach request carrying an encrypted IMSI to the first serving network according to the reason value for the asynchronousness of the user equipment alias identifier; obtain the encrypted IMSI according to the attach request, and send the encrypted IMSI to the home network, so that the home network performs network access authentication on the user equipment.

In an embodiment of the present disclosure, the second obtaining module is further configured to receive a second authentication failure message sent by the home network; send a user equipment identifier request message to the user equipment according to the second authentication failure message; and obtain the encrypted IMSI according to a response of the user equipment, resend an authentication request message carrying an encrypted IMSI to the home network, so that the home network performs network access authentication on the user equipment.

In an embodiment of the present disclosure, the second obtaining module is further configured to receive a request message to obtain an encrypted IMSI sent by the home network; send a user equipment identifier request message to the user equipment according to the request message; obtain the encrypted IMSI according to a response of the user equipment, and send the encrypted IMSI to the home network, so that the home network performs network access authentication on the user equipment.

In an embodiment of the present disclosure, the device further includes: a third receiving module configured to receive an attach request sent by the user equipment, the attach request carrying a temporary identifier; a third obtaining module configured to obtain a user security context from a second serving network according to the temporary identifier; a third sending module configured to send a request message for obtaining the encrypted IMSI or a user equipment alias identifier to the user equipment when obtaining the user security context fails; and a fourth obtaining module configured to obtain the encrypted IMSI or the user equipment alias identifier according to the message to perform network access authentication on the user equipment.

According to still another embodiment of an embodiment of the present disclosure, a storage medium is further provided. The storage medium is configured to store program codes for performing the following steps: receiving an authentication request message sent by a first serving network, the authentication request message carrying a user equipment alias identifier generated by user equipment; determining whether a local user equipment alias identifier is asynchronous with the user equipment alias identifier generated by the user equipment; and when the determination result is positive, obtaining an encrypted International Mobile Subscriber Identification Number IMSI for performing network access authentication on the user equipment.

In an embodiment of the present disclosure, the storage medium is further configured to store program codes for performing the following steps: obtaining an encrypted International Mobile Subscriber Identification Number IMSI for performing network access authentication on the user equipment includes: sending a first authentication failure message to the first serving network, wherein the first authentication failure message carries a reason value for the asynchronousness of the user equipment alias identifier, and the reason value for the asynchronousness of the user equipment alias identifier is used for notifying the user equipment to resend an attach request carrying an encrypted IMSI to the first serving network according to the reason value for the asynchronousness of the user equipment alias identifier; and obtaining the encrypted IMSI according to the attach request to perform network access authentication on the user equipment.

In an embodiment of the present disclosure, the storage medium is further configured to store program codes for performing the following steps: obtaining an encrypted International Mobile Subscriber Identification Number IMSI for performing network access authentication on the user equipment includes: sending a second authentication failure message to the first serving network; receiving an authentication request message carrying an encrypted IMSI re-sent by the first serving network according to the second authentication failure message; and obtaining the encrypted IMSI according to the authentication request message to perform network access authentication on the user equipment.

In an embodiment of the present disclosure, the storage medium is further configured to store program codes for performing the following steps: obtaining an encrypted International Mobile Subscriber Identification Number IMSI for performing network access authentication on the user equipment includes: sending a request message to obtain an encrypted IMSI to the first serving network; obtaining the encrypted IMSI according to a response message of the request message; and decrypting the encrypted IMSI, feeding back an authentication response message to the first serving network, wherein the authentication response message carries a user security context, and the user security context is used for performing network access authentication on the user equipment.

In an embodiment of the present disclosure, the storage medium is further configured to store program codes for performing the following steps: before receiving the authentication request message sent by the first serving network, the method further includes: receiving an encrypted IMSI sent by a second serving network; and after determining that the user equipment corresponding to the encrypted IMSI is valid, generating an alias index corresponding to a user equipment alias identifier to be used; and sending the alias index to the second serving network, so as to notify the user equipment to generate a user equipment alias identifier according to the alias index.

According to still another embodiment of an embodiment of the present disclosure, a storage medium is further provided. The storage medium is configured to store program codes for performing the following steps: sending an authentication request message to a home network, the authentication request message carrying a user equipment alias identifier generated by user equipment; according to a feedback of the home network, determining that a user equipment alias identifier in the home network is asynchronous with the user equipment alias identifier generated by the user equipment; and obtaining an encrypted International Mobile Subscriber Identification Number IMSI, and sending the encrypted IMSI to the home network, so that the home network performs network access authentication on the user equipment.

In an embodiment of the present disclosure, the storage medium is further configured to store program codes for performing the following steps: obtaining an encrypted IMSI and sending the encrypted IMSI to the home network, so that the home network performs network access authentication on the user equipment includes: receiving a first authentication failure message sent by the home network, wherein the first authentication failure message carries a reason value for the asynchronousness of the user equipment alias identifier; sending an attach failure message carrying the reason value for the asynchronousness of the user equipment alias identifier to the user equipment, to notify the user equipment to resend an attach request carrying an encrypted IMSI to the first serving network according to the reason value for the asynchronousness of the user equipment alias identifier; and obtaining the encrypted IMSI according to the attach request, and sending the encrypted IMSI to the home network, so that the home network performs network access authentication on the user equipment.

In an embodiment of the present disclosure, the storage medium is further configured to store program codes for performing the following steps: obtaining an encrypted IMSI and sending the encrypted IMSI to the home network, so that the home network performs network access authentication on the user equipment includes: receiving a second authentication failure message sent by the home network; sending a user equipment identifier request message to the user equipment according to the second authentication failure message; and obtaining the encrypted IMSI according to a response of the user equipment, resending an authentication request message carrying an encrypted IMSI to the home network, so that the home network performs network access authentication on the user equipment.

In an embodiment of the present disclosure, the storage medium is further configured to store program codes for performing the following steps: obtaining an encrypted IMSI and sending the encrypted IMSI to the home network, so that the home network performs network access authentication on the user equipment includes: receiving a request message to obtain an encrypted IMSI sent by the home network; sending a user equipment identifier request message to the user equipment according to the request message; and obtaining the encrypted IMSI according to a response of the user equipment, and sending the encrypted IMSI to the home network, so that the home network performs network access authentication on the user equipment.

In an embodiment of the present disclosure, the storage medium is further configured to store program codes for performing the following steps: before sending an authentication request message to the home network, the method further includes: receiving an attach request sent by the user equipment, the attach request carrying a temporary identifier; obtaining a user security context from a second serving network according to the temporary identifier; sending a request message for obtaining the encrypted IMSI or a user equipment alias identifier to the user equipment when obtaining of the user security context fails; and obtaining the encrypted IMSI or the user equipment alias identifier according to the message to perform network access authentication on the user equipment.

Through the embodiments of the present disclosure, an authentication request message sent by a first serving network is received, the authentication request message carrying a user equipment alias identifier generated by user equipment; whether a local user equipment alias identifier is asynchronous with the user equipment alias identifier generated by the user equipment is determined; and if the determination result is positive, an encrypted International Mobile Subscriber Identification Number IMSI is obtained for performing network access authentication on the user equipment. When the local user equipment alias identifier is asynchronous with the user equipment alias identifier generated by the user equipment, an encrypted International Mobile Subscriber Identification Number IMSI is obtained for performing network access authentication on the user equipment. Thus, embodiments of the present disclosure can solve the problem the network access process of the related art does not define how to proceed when the user equipment alias identifier in the user equipment is asynchronous with the user equipment alias identifier in the home network.

BRIEF DESCRIPTION OF THE DRAWINGS

The drawings described herein are intended to provide a further understanding of the present disclosure, and are intended to be a part of the present disclosure. The illustrative embodiments of the present disclosure and the description thereof are for explaining the present disclosure and do not constitute an undue limitation of the present disclosure. In the drawings.

DETAILED DESCRIPTION

Embodiments of the present disclosure will be described in detail below with reference to the accompanying drawings. It should be noted that the embodiments in the present application and the features in the embodiments may be combined with each other without conflict.

It is to be understood that the terms "first", "second", and the like in the specification and claims of the present disclosure are used to distinguish similar objects, and are not necessarily used to describe a particular order or sequence.

First Embodiment

Figure 1:
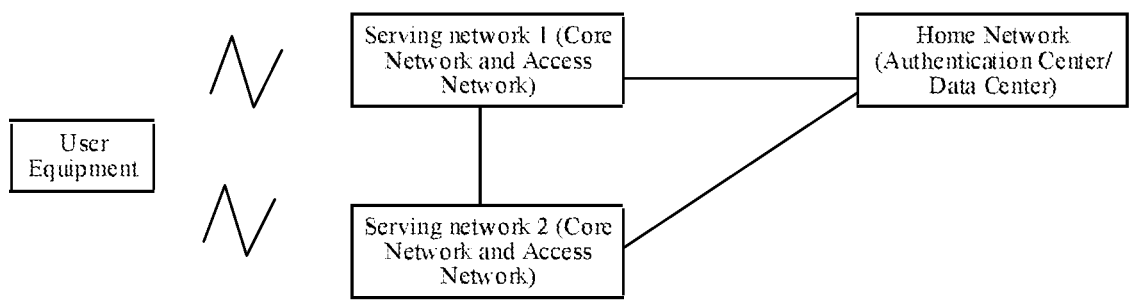
FIG. 1 is a schematic diagram of future 5G network access in the related art.
Figure 2:
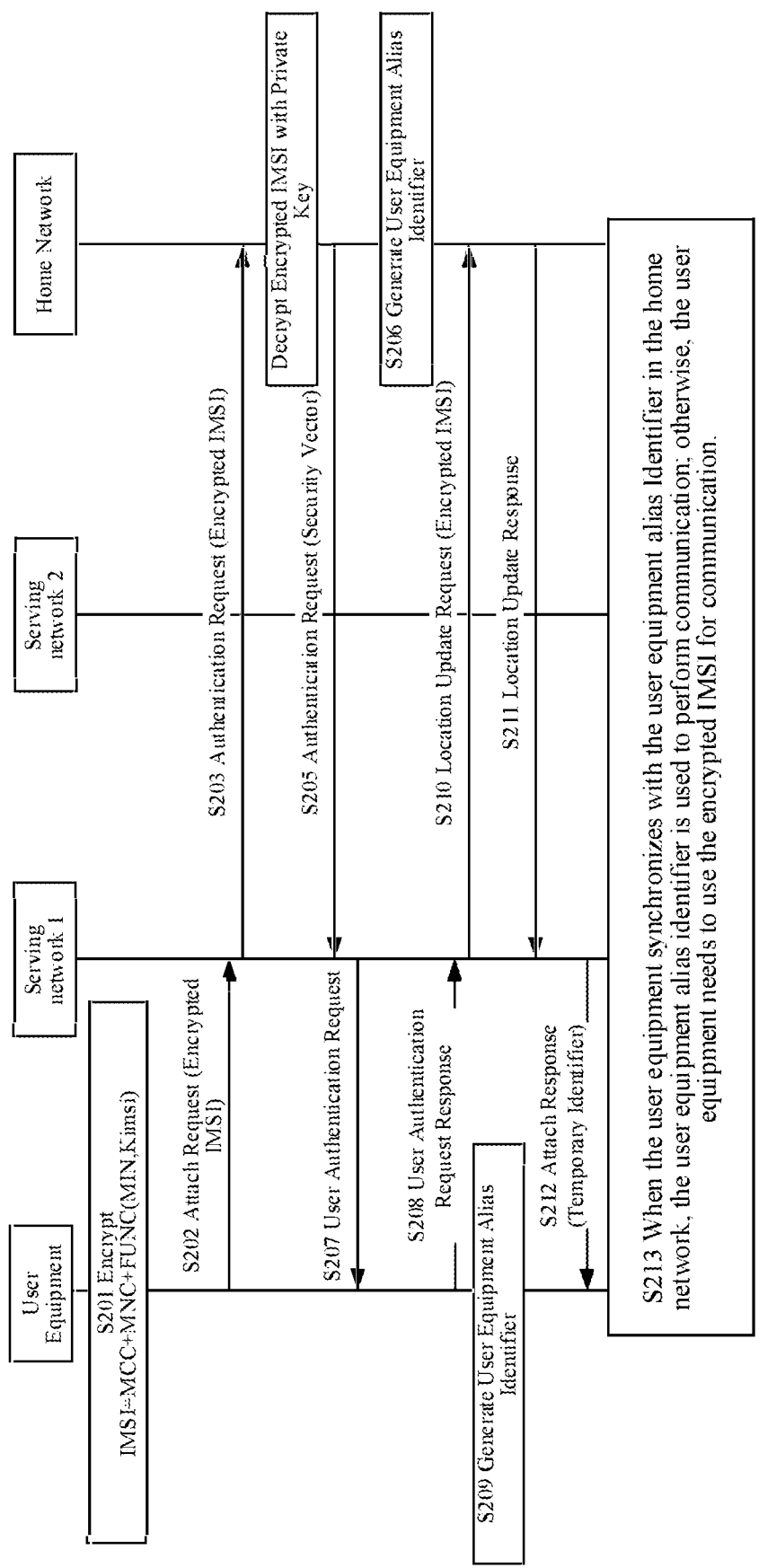
FIG. 2 is a schematic diagram of a process for protecting a user privacy with International Mobile Subscriber Identification Number IMSI when a user equipment accesses a serving network 1 in the related art.
Figure 3:
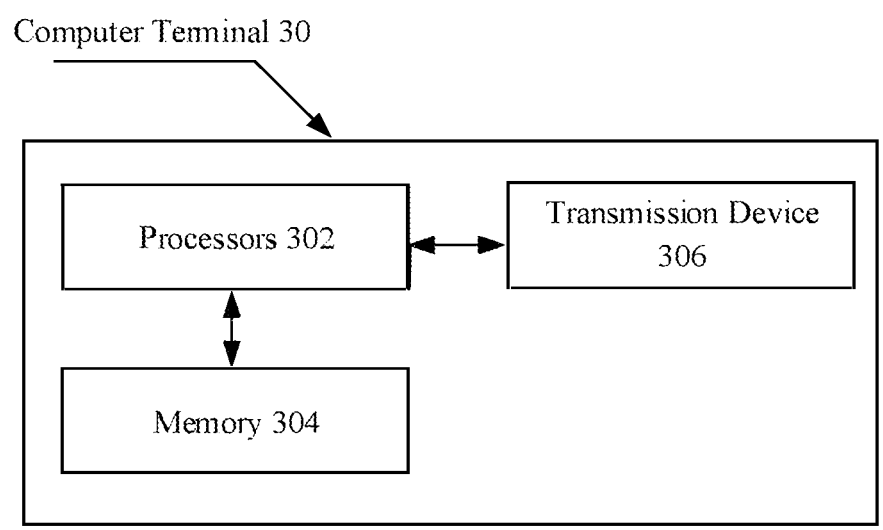
FIG. 3 is a block diagram showing a hardware structure of a computer terminal of a network access authentication method according to an embodiment of the present disclosure.

The method embodiments provided by the first embodiment of the present application can be executed in a computer terminal or the like. Taking a computer terminal as an example, FIG. 3 is a block diagram showing a hardware structure of a computer terminal of a network access authentication method according to an embodiment of the present disclosure. As shown in FIG. 3, a computer terminal 30 may include one or more (only one of which is shown) processors 302 (the processor 302 may include, but is not limited to, a processing device such as a microprocessor MCU or a programmable logic device FPGA), a memory 304 for storing data, and a transmission device 306 for implement a communication function. It will be understood by those skilled in the art that the structure shown in FIG. 3 is merely illustrative and does not limit the structure of the above electronic device. For example, the computer terminal 30 may also include more or fewer components than those shown in FIG. 3, or have a different configuration than that shown in FIG. 3.

The memory 304 can be configured to store software programs and modules of application software, such as the program instructions/modules corresponding to the network access authentication method in the embodiment of the present disclosure. The processor 302 executes the software programs and modules stored in the memory 304, thereby performing various functions and data processing, that is, implementing the above method. The memory 304 can include a high speed random access memory and can also include a non-volatile memory, such as one or more magnetic storage devices, flash memories, or other non-volatile solid state memories. In some examples, the memory 304 can further include a memory remotely located relative to the processor 302, which can be connected to the computer terminal 30 over a network. Examples of such networks include, but are not limited to, the Internet, intranets, local area networks, mobile communication networks, and combinations thereof.

The transmission device 306 is configured to receive or transmit data over a network. The specific examples of networks described above may include a wireless network provided by a communication provider of the computer terminal 30. In one example, the transmission device 306 includes a Network Interface Controller (NIC) that can be connected to other network devices through a base station to communicate with the Internet. In one example, the transmission device 306 can be a Radio Frequency (RF) module for communicating with the Internet wirelessly.

Figure 4:
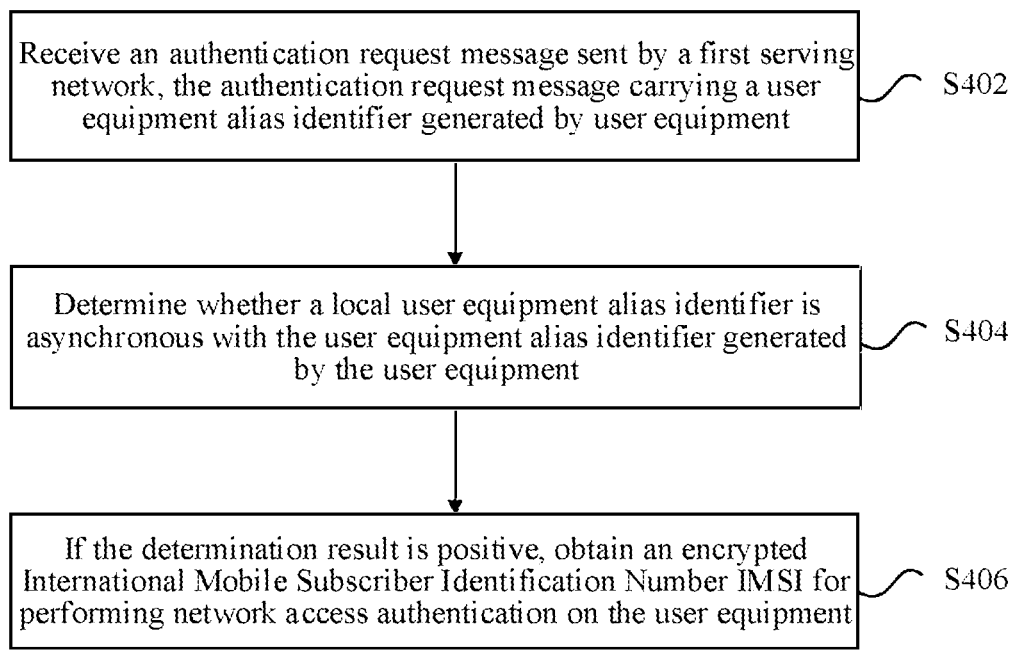
FIG. 4 is a first flowchart of network access authentication method according to an embodiment of the present disclosure.

In this embodiment, a network access authentication method performed in the above computer terminal is provided. FIG. 4 is a first flowchart of network access authentication method according to an embodiment of the present disclosure. As shown in FIG. 4, the process includes the following steps.

In step S402, an authentication request message sent by a first serving network is received. The authentication request message carries a user equipment alias identifier generated by user equipment.

In step S404, whether a local user equipment alias identifier is asynchronous with the user equipment alias identifier generated by the user equipment is determined.

In step S406, if the determination result is positive, an encrypted International Mobile Subscriber Identification Number IMSI is obtained for performing network access authentication on the user equipment.

Through the above steps, when the local user equipment alias identifier is asynchronous with the user equipment alias identifier generated by the user equipment, an encrypted International Mobile Subscriber Identification Number IMSI is obtained for performing network access authentication on the user equipment. Thus, the embodiment can solve the problem the network access process of the related art does not define how to proceed when the user equipment alias identifier in the user equipment is asynchronous with the user equipment alias identifier in the home network.

In an embodiment of the present disclosure, obtaining an encrypted IMSI for performing network access authentication on the user equipment includes: sending a first authentication failure message to the first serving network, wherein the first authentication failure message carries a reason value for the asynchronousness of the user equipment alias identifier, and the reason value for the asynchronousness of the user equipment alias identifier is used for notifying the user equipment to resend an attach request carrying an encrypted IMSI to the first serving network according to the reason value for the asynchronousness of the user equipment alias identifier; obtaining the encrypted IMSI according to the attach request to perform network access authentication on the user equipment. Through the above steps, since the attach procedure is performed again, to generate a user equipment alias identifier so as to ensure that the local user equipment alias identifier is synchronous with the user equipment alias identifier generated by the user equipment, a securer user equipment alias identifier can be generated.

In an embodiment of the present disclosure, obtaining an encrypted IMSI for performing network access authentication on the user equipment includes: sending a second authentication failure message to the first serving network; receiving an authentication request message carrying an encrypted IMSI re-sent by the first serving network according to the second authentication failure message; and obtaining the encrypted IMSI according to the authentication request message to perform network access authentication on the user equipment. Through the above steps, since only the authentication request message carrying the encrypted IMSI is received again to generate a user equipment alias identifier to ensure that the local user equipment alias identifier is synchronous with the user equipment alias identifier generated by the user equipment, the embodiment can eliminate the need for restarting from the initial steps of the attach process, and can save time for generating a user device aliases name identifier.

In an embodiment of the present disclosure, obtaining an encrypted IMSI for performing network access authentication on the user equipment includes: sending a request message to obtain an encrypted IMSI to the first serving network; obtaining the encrypted IMSI according to a response message of the request message; decrypting the encrypted IMSI, feeding back an authentication response message to the first serving network, wherein the authentication response message carries a user security context, and the user security context is used for performing network access authentication on the user equipment. Through the above steps, since the encrypted IMSI is directly obtained, a user equipment alias identifier can be generated to ensure that the local user equipment alias identifier is synchronized with the user equipment alias identifier generated by the user equipment, without receiving again the authentication request message carrying an encrypted IMSI. The embodiment can allow generation of the user equipment alias identifier quicker and more directly.

In an embodiment of the present disclosure, before the authentication request message sent by the first serving network is received, the method further includes: receiving an encrypted IMSI sent by a second serving network; after it is determined that the user equipment corresponding to the encrypted IMSI is valid, generating an alias index corresponding to a user equipment alias identifier to be used; sending the alias index to the second serving network, so as to notify the user equipment to generate a user equipment alias identifier according to the alias index. Since the alias index corresponding to the user equipment alias identifier to be used is generated, the user equipment can generate a user equipment alias identifier according to the alias index. Thus, the embodiment can eliminate the need for generating a user equipment alias identifier by decrypting the encrypted IMSI again after mutual authentication with the serving network, and can reduce the burden of the home network.

Figure 5:
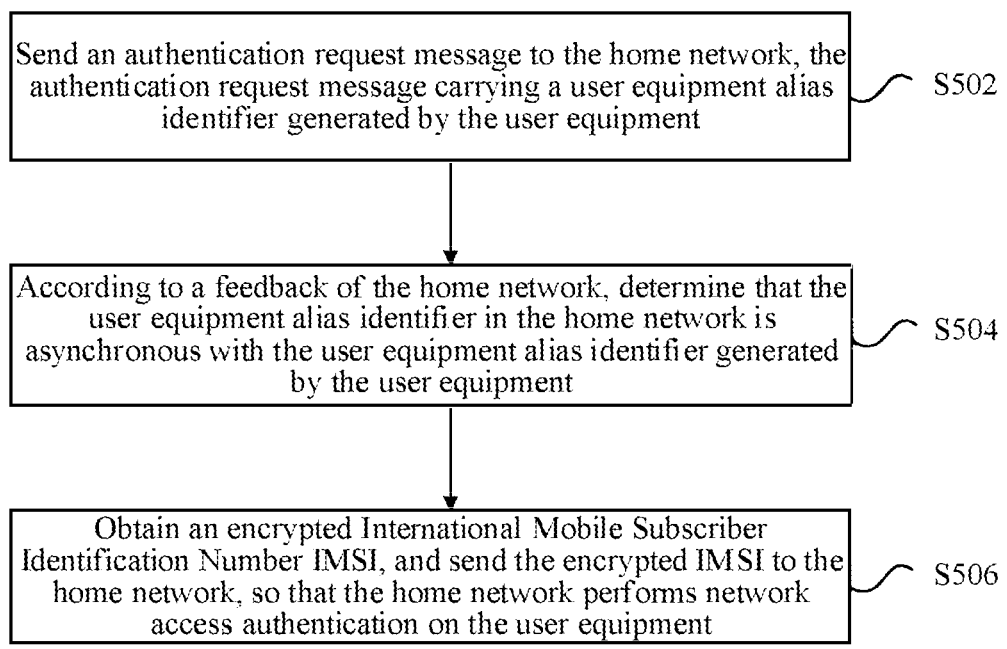
FIG. 5 is a second flowchart of a network access authentication method according to an embodiment of the present disclosure.

In an embodiment, a network access authentication method performed by the above computer terminal is provided. FIG. 5 is a second flowchart of a network access authentication method according to an embodiment of the present disclosure. As shown in FIG. 5, the process includes the following steps.

In step S502, an authentication request message is sent to the home network. The authentication request message carries a user equipment alias identifier generated by the user equipment.

In step S504, according to a feedback of the home network, it is determined that the user equipment alias identifier in the home network is asynchronous with the user equipment alias identifier generated by the user equipment.

In step S506, an encrypted International Mobile Subscriber Identification Number (IMSI) is obtained, and the encrypted IMSI to the home network is sent, so that the home network performs network access authentication on the user equipment.

Through the above steps, when the user equipment alias identifier in the home network is asynchronous with the user equipment alias identifier generated by the user equipment, an encrypted International Mobile Subscriber Identification Number IMSI is obtained. The encrypted IMSI is sent to the home network such that the home network performs network access authentication on the user equipment. The embodiment can solve the problem the network access process of the related art does not define how to proceed when the user equipment alias identifier in the user equipment is asynchronous with the user equipment alias identifier in the home network.

In an embodiment of the present disclosure, obtaining an encrypted IMSI and sending the encrypted IMSI to the home network, so that the home network performs network access authentication on the user equipment includes: receiving a first authentication failure message sent by the home network, wherein the first authentication failure message carries a reason value for the asynchronousness of the user equipment alias identifier; and sending an attach failure message carrying the reason value for the asynchronousness of the user equipment alias identifier to the user equipment, to notify the user equipment to resend an attach request carrying an encrypted IMSI to the first serving network according to the reason value for the asynchronousness of the the user equipment alias identifier; obtaining the encrypted IMSI according to the attach request, and sending the encrypted IMSI to the home network, so that the home network performs network access authentication on the user equipment. Through the above steps, since the attach procedure is performed again to generate a user equipment alias identifier to ensure that the local user equipment alias identifier is synchronous with the user equipment alias identifier generated by the user equipment, a securer user equipment alias identifier can be generated.

In an embodiment of the present disclosure, obtaining an encrypted IMSI and sending the encrypted IMSI to the home network, so that the home network performs network access authentication on the user equipment includes: receiving a second authentication failure message sent by the home network; sending a user equipment identifier request message to the user equipment according to the second authentication failure message; and obtaining the encrypted IMSI according to a response of the user equipment, resending an authentication request message carrying the encrypted IMSI to the home network, so that the home network performs network access authentication on the user equipment. Through the above steps, since only the authentication request message carrying the encrypted IMSI is received again to generate a user equipment alias identifier to ensure that the local user equipment alias identifier is synchronous with the user equipment alias identifier generated by the user equipment, the embodiment can eliminate the need for restarting from the initial steps of the attach process, and can save time for generating a user device aliases name identifier.

In an embodiment of the present disclosure, obtaining an encrypted IMSI and sending the encrypted IMSI to the home network, so that the home network performs network access authentication on the user equipment includes: receiving a request message to obtain an encrypted IMSI sent by the home network; sending a user equipment identifier request message to the user equipment according to the request message; obtaining the encrypted IMSI according to a response of the user equipment, and sending the encrypted IMSI to the home network, so that the home network performs network access authentication on the user equipment. Through the above steps, since the encrypted IMSI is directly obtained, a user equipment alias identifier can be generated to ensure that the local user equipment alias identifier is synchronized with the user equipment alias identifier generated by the user equipment, without receiving again the authentication request message carrying an encrypted IMSI. The embodiment can allow generation of the user equipment alias identifier quicker and more directly.

In an embodiment of the present disclosure, before an authentication request message to the home network is sent, the method includes: receiving an attach request sent by the user equipment, the attach request carrying a temporary identifier; obtaining a user security context from a second serving network according to the temporary identifier; and sending a request message for obtaining the encrypted IMSI or a user equipment alias identifier to the user equipment if obtaining of the user security context fails; obtaining the encrypted IMSI or the user equipment alias identifier according to the message to perform network access authentication on the user equipment.

In order to facilitate the understanding of the above embodiments, the embodiments of the present disclosure will be described below in detail with an example in which the second serving network is a serving network 1, and the first serving network is a serving network 2.

Figure 6:
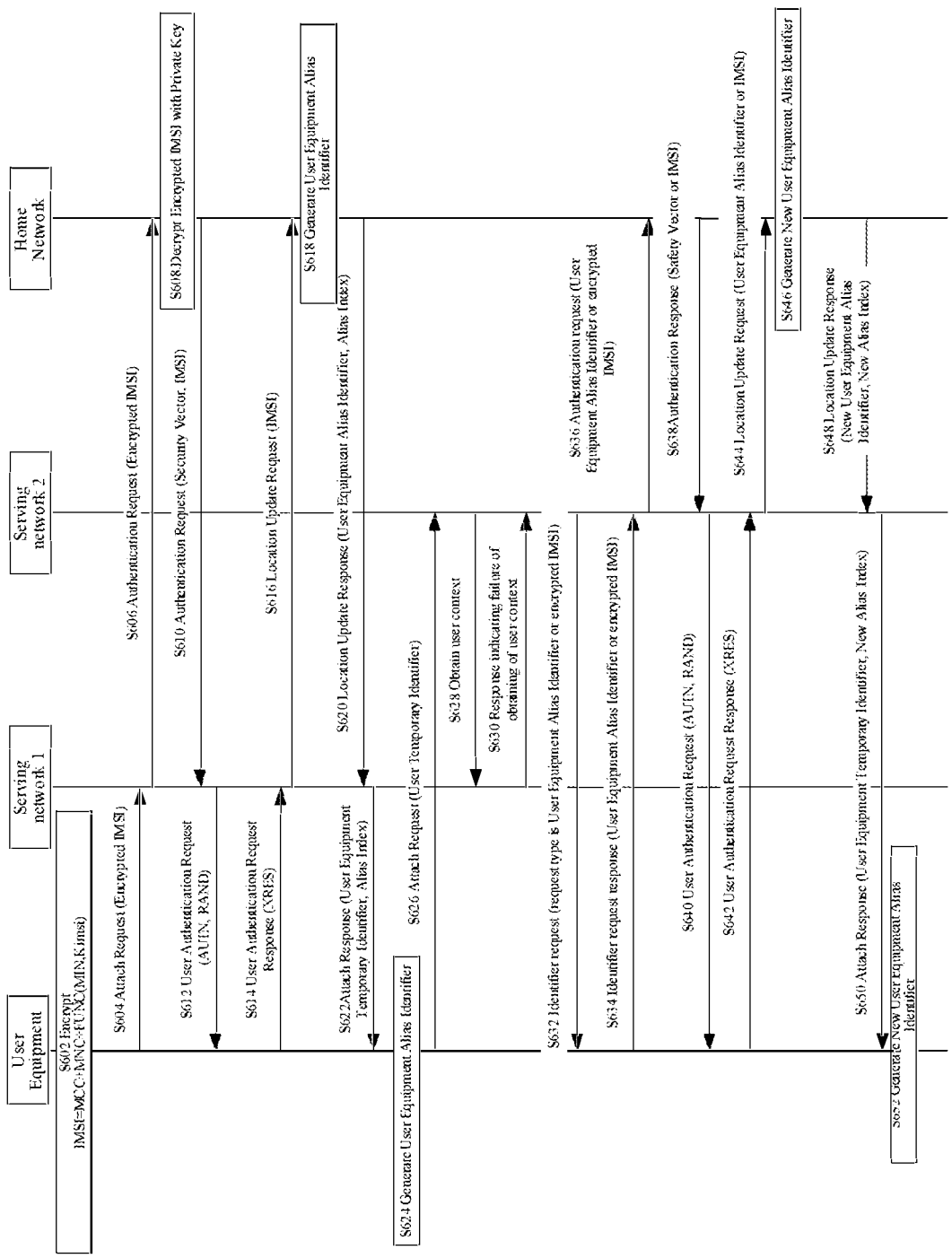
FIG. 6 is a schematic flowchart of a serving network obtaining context failure process according to an embodiment of the present disclosure.

FIG. 6 is a schematic flowchart showing processes when obtaining of context by a serving network fails according to an embodiment of the present disclosure. The core idea is: after the home network decrypts the encrypted IMSI, the home network transmits the security context and the decrypted IMSI to the serving network. After the serving network and the user equipment perform two-way authentication, the home network generates a user equipment alias identifier group, determines an alias index for the user equipment alias identifier to be used, and sends the user subscription data, the user equipment alias identifier and the alias index to the serving network. The serving network sends the temporary identifier and the alias index to the user equipment. The user equipment generates a user equipment alias identifier according to the alias index. The user equipment initiates an attach request to the serving network with the temporary identifier. The serving network fails to obtain the user context from other network(s), the serving network initiates a user equipment identifier request to the user equipment, and the request type is an encrypted IMSI or the user equipment alias identifier. The serving network performs the attach procedure with the encrypted IMSI or the user equipment alias identifier. As shown in FIG. 6, the procedure includes the following steps.

In step S602, the user equipment partially encrypts the IMSI with a public key Kimsi. The security method is keeping the original MCC and the MNC unchanged, and only encrypting the MSIN. That is, the encrypted IMSI=MCC+MNC+ encryption function (MSIN, Kimsi), and the public key is the public key Kimsi of the home network.

In step S604, the user equipment sends an initial attach request message to the serving network 1. The message carries an encrypted IMSI.

In step S606, the serving network 1 searches for the home network of the user equipment according to the MCC and the MNC in the encrypted IMSI, and sends an authentication request message to the home network. The message carries the encrypted IMSI.

In step S608, the home network decrypts the encrypted IMSI with the private key paired with the public key, to obtain the decrypted IMSI, and identifies the user corresponding to the encrypted IMSI.

In step S610, the home network sends an authentication request response message to the serving network 1. The message carries a user security context, that is, a security vector set, and the message also carries the decrypted IMSI.

In step S612, the serving network 1 sends a user authentication request message to the user equipment. The message carries an authentication token AUTN and a random number RAND. The user equipment verifies the validity of the network through the authentication token and calculates an expected response value XRES with RAND.

In step S614, the user equipment sends back a user authentication request response message to the serving network 1, and the message carries the expected response value XRES. The serving network 1 compares the expected response value in the security context with the received expected response value, and if they are equal, the serving network 1 authenticates the user equipment as valid.

In step S616, the serving network 1 sends a location update request message to the home network. The message carries an IMSI.

In step S618, the home network generates a user equipment alias identifier group corresponding to the user equipment with a key K1 shared with the user equipment, where the user equipment alias identifier includes the MCC and the MNC of the user equipment and a user data center identifier. The home network generates a corresponding alias index for determining a corresponding user equipment alias identifier.

In step S620, the home network sends back a location update request response message to the serving network 1. The message carries user subscription data, the user equipment alias identifier and the alias index, or the user data center identifier.

In step S622, the serving network 1 allocates a temporary identifier to the user equipment. The temporary identifier includes a network identifier of the serving network, a device identifier of the serving network, and a temporary code allocated to the user equipment.

The serving network sends an attach success response message back to the user equipment, the message carrying the temporary identifier and the message further carrying the alias index or the user data center identifier.

In step S624, the user equipment determines a corresponding user equipment alias identifier according to the alias index, where the user equipment alias identifier includes the MCC and the MNC of the user equipment, and the user data center identifier.

In step S626, the user equipment sends an attach request message to the serving network 2, the message carrying a temporary identifier.

In step S628, when the serving network 2 queries according to the temporary identifier, and finds that there is no user context in local, the serving network 2 initiates a request message to obtain user context to the serving network 1 according to the network identifier of the serving network and the device identifier of the serving network in the temporary identifier, the message carrying the temporary identifier. Or, if it is not possible to identify the corresponding serving network according to the temporary identifier, or if a corresponding serving network 1 has an abnormal communication link, the process proceeds to step S632.

In step S630, the serving network 1 cannot find the corresponding user context according to the temporary identifier, and sends back a user context failure response message to the serving network 2.

In step S632, the serving network 2 sends an identifier request message to the user equipment, and the identifier request type is one of an encrypted IMSI or a user equipment alias identifier.

In step S634, the user equipment selects a corresponding encrypted IMSI or user equipment alias identifier according to the identifier request type, and sends back an identifier request response message to the serving network 2, the message carrying the encrypted IMSI or the user equipment alias identifier.

In step S636, the serving network 2 searches for the home network of the user equipment according to the MCC and the MNC in the encrypted IMSI or the user equipment name, and sends an authentication request message to the home network, the message carrying the encrypted IMSI or the user equipment alias identifier.

In step S638, if the message carries the encrypted IMSI, the home network decrypts the encrypted IMSI with the private key paired with the public key, obtains the decrypted IMSI, and identifies the user corresponding to the encrypted IMSI. The home network sends back an authentication request response to the serving network 2. The message carries a user security context, that is, a security vector set, the message further carries the decrypted IMSI. If the message carries the user equipment alias identifier, the user data center is found according to the user data center in the user equipment alias identifier, and the corresponding user in the user data center is found. An authentication request response message is sent back to the serving network 2, the message carrying the user security context, i.e. the security vector set.

In step S640, the serving network 1 sends a user authentication request message to the user equipment. The message carries the authentication token AUTN and the random number RAND. The user equipment verifies the validity of the network with the authentication token, and calculates the expected response value XRES with the RND.

In step S642, the user equipment sends back a user authentication request response message to the serving network 1, the message carrying the expected response value XRES. The serving network 1 compares the expected response value in the security context with the received expected response value, and if they are equal, the serving network 1 authenticates that the user equipment is valid.

In step S644, the serving network 2 sends a location update request message to the home network, the message carrying an IMSI or a user equipment alias identifier.

In step S646, the home network generates a user equipment alias identifier group corresponding to the new user equipment with a key K1 shared with the user equipment, where the user equipment alias identifier includes the MCC and the MNC of the user equipment, and the user data center identifier. The home network generates a corresponding new alias index and determines a corresponding new user equipment alias identifier.

In step S648, the home network sends a location update request response message to the serving network 2, the message carrying the user subscription data, the new user equipment alias identifier and the new alias index, or the user data center identifier.

In step S650, the serving network 2 allocates a new temporary identifier to the user equipment, where the new temporary identifier includes a network identifier of the serving network, a device identifier of the serving network, and a new temporary code allocated to the user equipment, and sends back an attach success response message to the user equipment, the message carrying a new temporary identifier, the message further carrying a new alias index or a user data center identifier.

In step S652, the user equipment generates a new user equipment alias identifier group corresponding to the user equipment with the key K1, where the user equipment alias identifier includes the MCC and the MNC of the user equipment, and the user data center identifier. The user equipment determines the corresponding new user equipment alias identifier according to the new alias index.

Figure 7:
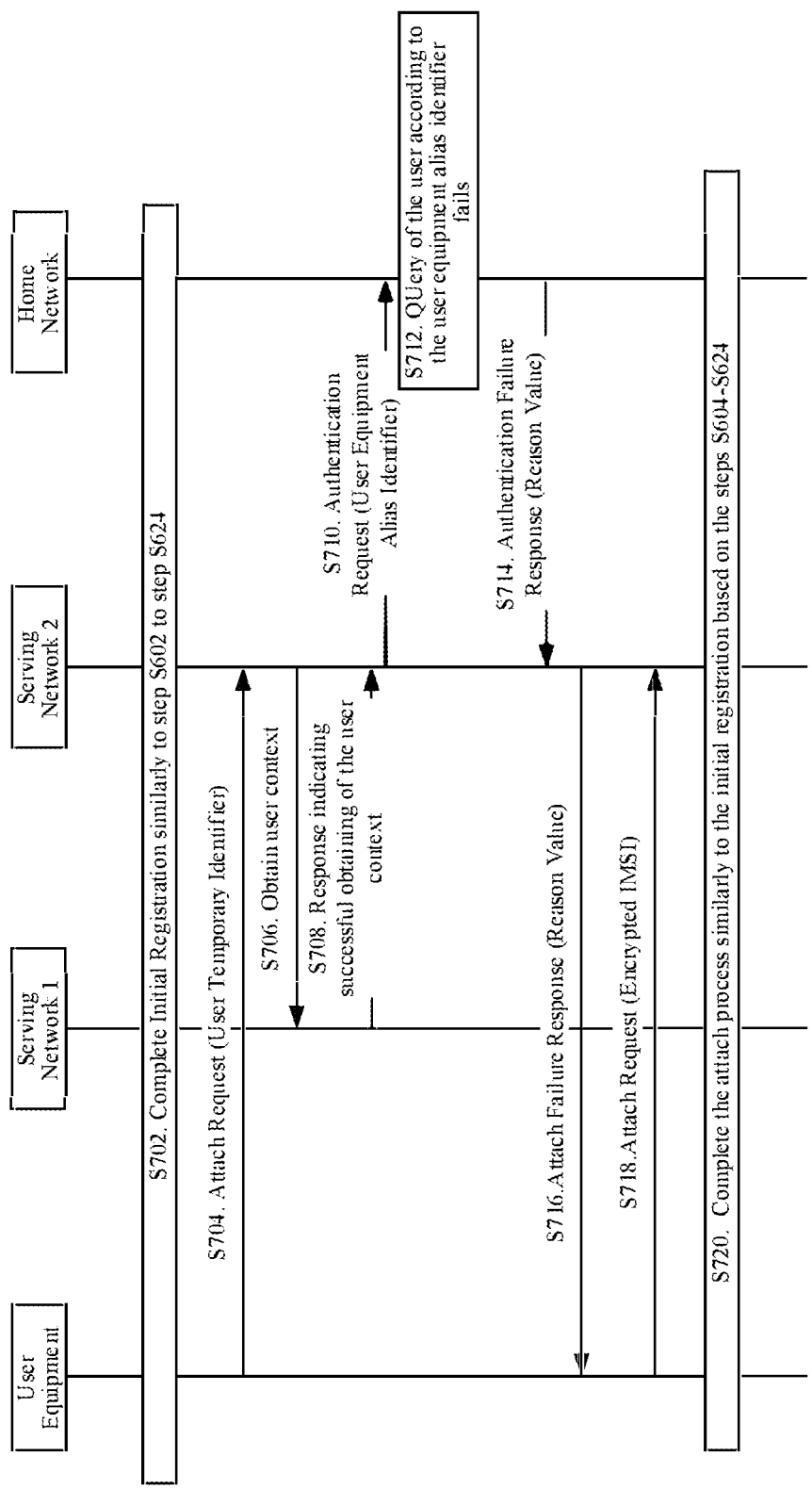
FIG. 7 is a first schematic flowchart of a processing procedure when a home network detects asynchronous user equipment alias identifier.

FIG. 7 is a first schematic flowchart of a processing procedure when a home network detects asynchronous user equipment alias identifier. The core idea is that after the home network receives an authentication request message from the serving network, it discovers asynchronousness of the user equipment alias identifier in the user equipment, the home network sends back to the serving network an authentication failure message, the message carrying a reason value for the asynchronousness of the user equipment alias identifier. The serving network sends back an attach failure message to the serving network, the message carrying a reason value for the asynchronousness of the user equipment alias identifier. The user equipment re-initiates an attach request to the serving network with an encrypted IMSI according to the reason value for the asynchronousness of the user equipment alias identifier. As shown in FIG. 7, the process includes the following steps.

In step S702, initial registration is completed in the serving network 1 according to step S602 to step S624, or registration is completed once in other networks, the user equipment having a temporary identifier and a user equipment alias identifier.

In step S704, the user equipment sends an attach request message to the serving network 2, the message carrying a temporary identifier.

In step S706, when the serving network 2 queries according to the temporary identifier, and finds that there is no local user context, the serving network 2 initiates a request message to obtain user context to the serving network 1 according to the network identifier of the serving network and the device identifier of the serving network in the temporary identifier, the message carrying the temporary identifier.

In step S708, the serving network 1 searches for the corresponding user context according to the temporary identifier, and sends back a user context response message to the serving network 2, the message carrying the user context.

In step S710, the serving network 2 searches for the home network of the user equipment according to the MCC and the MNC in the user equipment name identifier in the user context, and sends an authentication request message to the home network, the message carrying the user equipment alias identifier.

In step S712, the home network fails to query the user according to the user equipment alias identifier.

In step S714, the home network sends back an authentication failure message to the serving network 2, the message carrying a reason value for failure in querying the user equipment alias identifier.

In step S716, the serving network 2 sends back an attach failure response message to the user equipment, the message carrying the reason value for failure in querying the user equipment alias identifier.

In step S718, the user equipment initiates an attach request message to the serving network 2 according to the reason value for failure, the message carrying the encrypted IMSI.

In step S720, the attach process similar to the initial registration in the serving network 2 is completed according to steps S604-S624.

Figure 8:
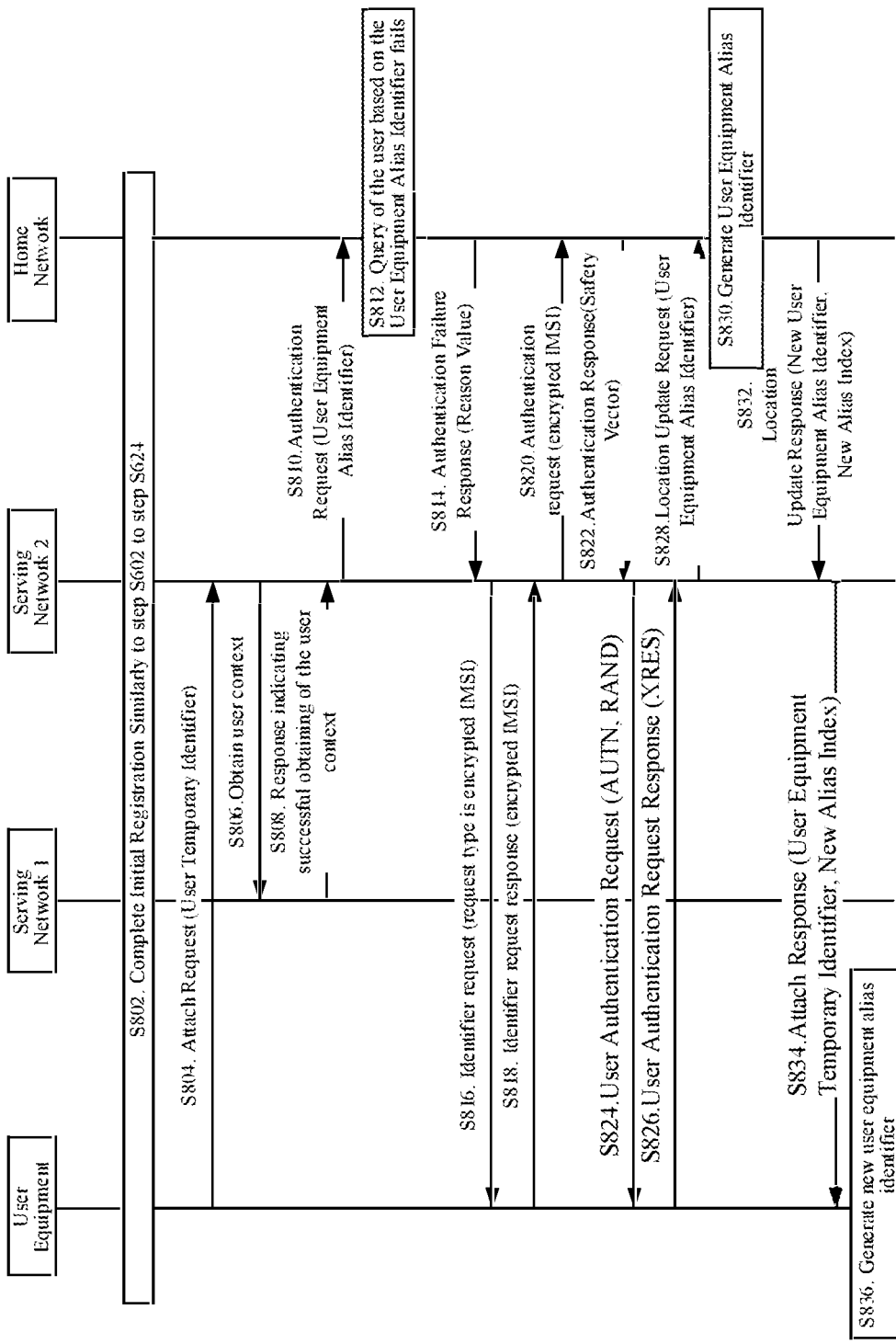
FIG. 8 is a second schematic flowchart of a processing procedure when a home network detects asynchronous user equipment alias identifier.

FIG. 8 is a second schematic diagram of a process for asynchronously processing a user equipment alias identifier in a home network according to an embodiment of the present disclosure. The core idea is that after the home network receives an authentication request message from the serving network, it discovers asynchronousness of the user equipment alias identifier in the user equipment, the home network sends back to the serving network an authentication failure message, the message carrying a reason value for the asynchronousness of the user equipment alias identifier. The serving network initiates a user equipment identifier request message to the user equipment, and the request identifier type is encrypted IMSI. The serving network initiates a re-authentication process with the encrypted IMSI, and completes the subsequent attach procedure. As shown in FIG. 8, the process includes the following steps.

In step S802, initial registration is completed in the serving network 1 according to step S602 to step S624, or registration is completed once in other network(s), the user equipment having a temporary identifier and a user equipment alias identifier.

In step S804, the user equipment sends an attach request message to the serving network 2, the message carrying a temporary identifier.

In step S806, when the serving network 2 queries according to the temporary identifier, and finds that there is no local user context, the serving network 2 initiates a request message to obtain user context to the serving network 1 according to the network identifier of the serving network and the device identifier of the serving network in the temporary identifier, the message carrying the temporary identifier.

In step S808, the serving network 1 searches for the corresponding user context according to the temporary identifier, and sends back a user context response message to the serving network 2, the message carrying the user context.

In step S810, the serving network 2 searches for the home network of the user equipment according to the MCC and the MNC in the user equipment name identifier in the user context, and sends an authentication request message to the home network, the message carrying the user equipment alias identifier.

In step S812, the home network fails to query the user according to the user equipment alias identifier.

In step S814, the home network sends back an authentication failure message to the serving network 2, the message carrying a reason value for failure in querying the user equipment alias identifier.

In step S816, the serving network 2 initiates an identifier request message to the user equipment, and the identifier request type is an encrypted IMSI.

In step S818, the user equipment selects a corresponding encrypted IMSI according to the identifier request type, and sends back an identifier request response message to the serving network 2, the message carrying the encrypted IMSI.

In step S820, the serving network 2 searches for the home network of the user equipment according to the MCC and the MNC in the encrypted IMSI or the user equipment name, and sends an authentication request message to the home network, the message carrying the encrypted IMSI.

In step S822, the home network decrypts the encrypted IMSI with the private key paired with the public key, obtains the decrypted IMSI, and identifies the user corresponding to the encrypted IMSI. The home network sends back an authentication request response to the serving network 2, the message carrying a user security context, that is, a security vector set, the message further carrying the decrypted IMSI.

In step S824, the serving network 1 sends a user authentication request message to the user equipment, the message carrying the authentication token AUTN and the random number RAND, and the user equipment verifies the validity of the network with the authentication token, and calculates the expected response value XRES with the RND.

In step S826, the user equipment sends back a user authentication request response message to the serving network 1, the message carrying the expected response value XRES. The serving network 1 compares the expected response value in the security context with the received expected response value, and if they are equal, the serving network 1 authenticates that the user equipment is valid.

In step S828, the serving network 2 sends a location update request message to the home network, the message carrying an IMSI.

In step S830, the home network generates a user equipment alias identifier group corresponding to the new user equipment with a key K1 shared with the user equipment, where the user equipment alias identifier includes the MCC and the MNC of the user equipment, and the user data center identifier. The home network generates a corresponding new alias index and determines a corresponding new user equipment alias identifier.

In step S832, the home network sends a location update request response message to the serving network 2, the message carrying the user subscription data, the new user equipment alias identifier and the new alias index, or the user data center identifier.

In step S834, the serving network 2 allocates a new temporary identifier to the user equipment, where the new temporary identifier includes a network identifier of the serving network, a device identifier of the serving network, and a new temporary code allocated to the user equipment, and sends back an attach success response message to the user equipment. The message carries a new temporary identifier and the message further carries a new alias index or a user data center identifier.

In step S836, the user equipment generates a new user equipment alias identifier group corresponding to the user equipment with the key K1, where the user equipment alias identifier includes the MCC and the MNC of the user equipment, and the user data center identifier, and the user equipment determines the corresponding new user equipment alias identifier according to the new alias index.

Figure 9:
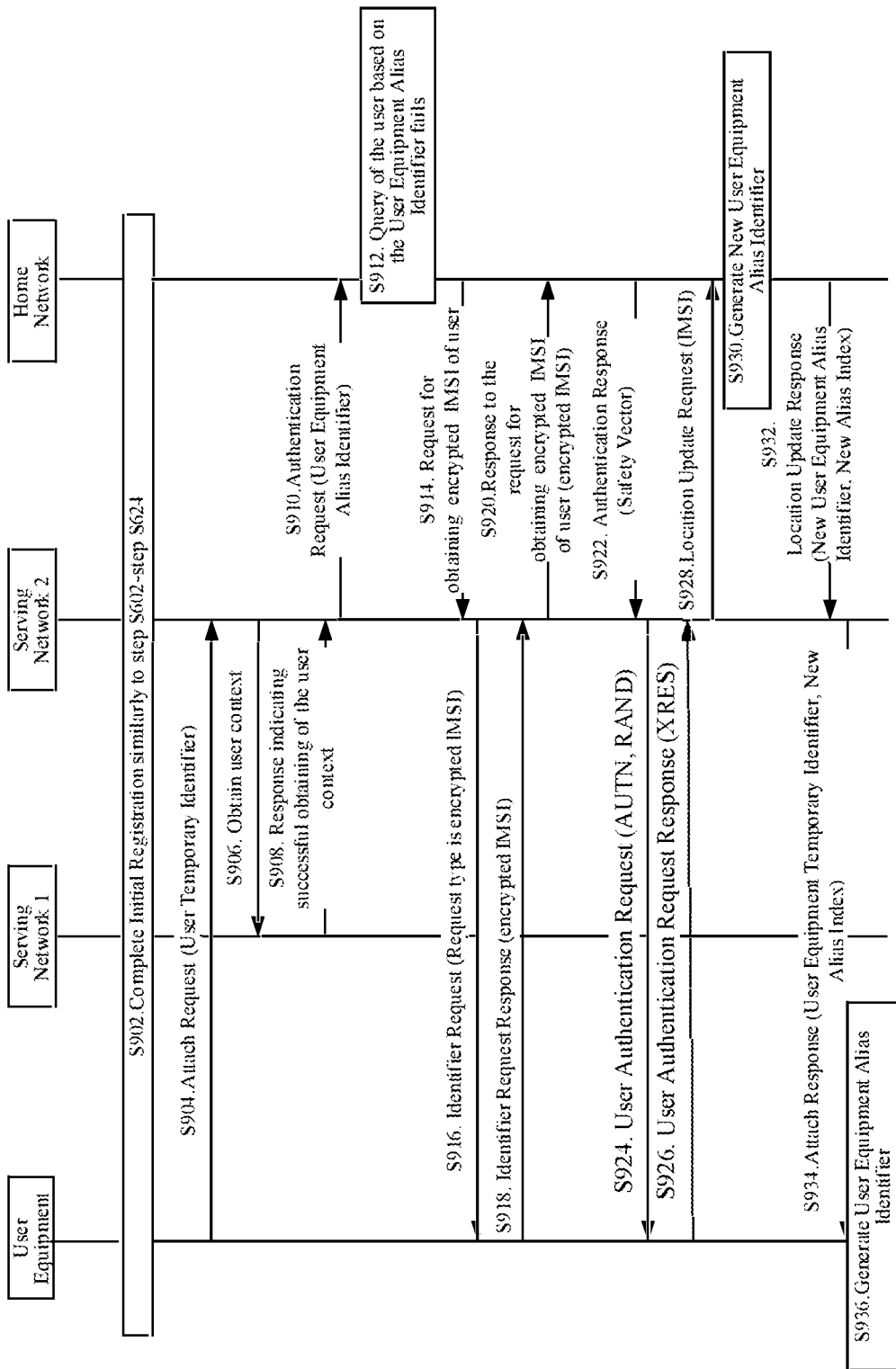
FIG. 9 is a third schematic flowchart of a processing procedure when a home network detects asynchronous user equipment alias identifier.

FIG. 9 is a third schematic diagram of a process for asynchronously processing a user equipment alias identifier in a home network according to an embodiment of the present disclosure. The core idea is that after the home network receives an authentication request message from the serving network, it discovers asynchronousness of the user equipment alias identifier in the user equipment, the home network sends to the serving network a request message to obtain an encrypted IMSI, the serving network sends a user equipment identifier request to the user equipment, where the type of the identifier request is the encrypted IMSI; after the home network obtains the encrypted IMSI, the home network decrypts the IMSI, and completes the subsequent attach procedure. As shown in FIG. 9, the process includes the following steps.

In step S902, initial registration is completed in the serving network 1 according to step S602 to step S624, or registration is completed once in other network(s), the user equipment having a temporary identifier and a user equipment alias identifier.

In step S904, the user equipment sends an attach request message to the serving network 2, the message carrying a temporary identifier.

In step S906, when the serving network 2 queries according to the temporary identifier, and finds that there is no user context in local, the serving network 2 initiates a request message to obtain user context to the serving network 1 according to the network identifier of the serving network and the device identifier of the serving network in the temporary identifier, the message carrying the temporary identifier.

In step S908, the serving network 1 searches for the corresponding user context according to the temporary identifier, and sends back a user context response message to the serving network 2, the message carrying the user context.

In step S910, the serving network 2 searches for the home network of the user equipment according to the MCC and the MNC in the user equipment name identifier in the user context, and sends an authentication request message to the home network, the message carrying the user equipment alias identifier.

In step S912, the home network fails to query the user according to the user equipment alias identifier.

In step S914, the home network sends to the serving network 2 a request message to obtain an encrypted IMSI of the user.

In step S916, the serving network 2 initiates an identifier request message to the user equipment, and the identifier request type is an encrypted IMSI.

In step S918, the user equipment selects a corresponding encrypted IMSI according to the identifier request type, and sends back an identifier request response message to the serving network 2, the message carrying the encrypted IMSI.

In step S920, the serving network 2 sends back a user encrypted IMSI response message back to the home network, the message carrying the encrypted IMSI.

In step S922, the home network decrypts the encrypted IMSI with the private key paired with the public key, obtains the decrypted IMSI, and identifies the user corresponding to the encrypted IMSI. The home network sends back an authentication request response to the serving network 2, the message carrying a user security context, that is, a security vector set, the message further carrying the decrypted IMSI.

In step S924, the serving network 1 sends a user authentication request message to the user equipment, the message carrying the authentication token AUTN and the random number RAND, and the user equipment verifies the validity of the network with the authentication token, and calculates the expected response value XRES with the RND.

In step S926, the user equipment sends back a user authentication request response message to the serving network 1, the message carrying the expected response value XRES. The serving network 1 compares the expected response value in the security context with the received expected response value, and if they are equal, the serving network 1 authenticates that the user equipment is valid.

In step S928, the serving network 2 sends a location update request message to the home network, the message carrying an IMSI.

In step S930, the home network generates a user equipment alias identifier group corresponding to the new user equipment with a key K1 shared with the user equipment, where the user equipment alias identifier includes the MCC and the MNC of the user equipment, and the user data center identifier. The home network generates a corresponding new alias index and determines a corresponding new user equipment alias identifier.

In step S932, the home network sends a location update request response message to the serving network 2, the message carrying the user subscription data, the new user equipment alias identifier and the new alias index, or the user data center identifier.

In step S934, the serving network 2 allocates a new temporary identifier to the user equipment, where the new temporary identifier includes a network identifier of the serving network, a device identifier of the serving network, and a new temporary code allocated to the user equipment, and sends back an attach success response message to the user equipment, the message carrying a new temporary identifier, the message further carrying a new alias index or a user data center identifier.

In step S936, the user equipment generates a new user equipment alias identifier group corresponding to the user equipment with the key K1, where the user equipment alias identifier includes the MCC and the MNC of the user equipment, and the user data center identifier, and the user equipment determines the corresponding new user equipment alias identifier according to the new alias index.

It can be seen that in the above embodiments, the asynchronousness in the user equipment alias identifier is diagnosed by the serving network and the home network, and corresponding processes are performed. Thus, the embodiments of the present disclosure can solve the problem that the user equipment alias identifiers in the home network and the serving network are asynchronous.

Through the description of the above embodiments, those skilled in the art can clearly understand that the method according to the above embodiments can be implemented by means of software in combination with a necessary general hardware platform, of course, can be implemented by hardware, but in many cases, the former is a better implementation. Based on such understanding, the technical solutions of the embodiments of the present disclosure, or the parts of the technical solutions embodiments of the present disclosure contributing over prior arts, may be embodied in the form of a software product in essence or in the form of a software product stored in a storage medium (such as ROM/RAM, a magnetic disc, an optical disc), including a number of instructions for causing a terminal device (which may be a mobile phone, a computer, a server, or a network device, etc.) to perform the methods described in various embodiments of the present disclosure.

Second Embodiment

In an embodiment, a network access authentication device is also provided, which is used to implement the above embodiments and exemplary implementation, and description that has been made will not be repeated. As used below, the term "module" may be a combination of software and/or hardware implementing a predetermined function. Although the devices described in the following embodiments are preferably implemented in software, hardware or a combination of software and hardware is also possible and can be contemplated.

Figure 10:
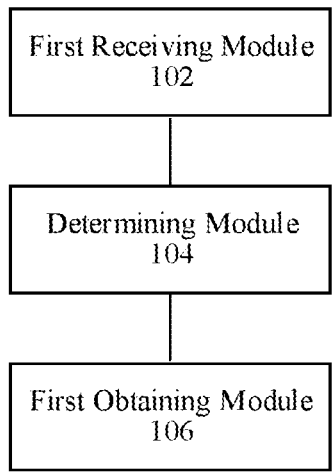
FIG. 10 is a first structural block diagram of a network access authentication device according to an embodiment of the present disclosure.

FIG. 10 is a first structural block diagram of a network access authentication device according to an embodiment of the present disclosure. As shown in FIG. 10, the apparatus includes:

a first receiving module 102 configured to receive an authentication request message sent by a first serving network, the authentication request message carrying a user equipment alias identifier generated by user equipment;

a determining module 104 connected to the first receiving module 102, and configured to determine whether a local user equipment alias identifier is asynchronous with a user equipment alias identifier generated by the user equipment; and a first obtaining module 106 connected to the determining module 104, and configured to, when the determination result is positive, obtain an encrypted International Mobile Subscriber Identification Number IMSI for performing network access authentication on the user equipment.

In an embodiment of the present disclosure, the first obtaining module is further configured to send a first authentication failure message to the first serving network, wherein the first authentication failure message carries a reason value for the asynchronousness of the user equipment alias identifier, and the reason value for the asynchronousness of the user equipment alias identifier is used for notifying the user equipment to resend an attach request carrying an encrypted IMSI to the first serving network according to the reason value for the asynchronousness of the user equipment alias identifier; obtain the encrypted IMSI according to the attach request, and perform network access authentication on the user equipment.

In an embodiment of the present disclosure, the first obtaining module is configured to send a second authentication failure message to the first serving network; receive an authentication request message carrying the encrypted IMSI re-sent by the first serving network according to the second authentication failure message; and obtain the encrypted IMSI according to the authentication request message to perform network access authentication on the user equipment.

In an embodiment of the present disclosure, the first obtaining module is configured to send a request message to obtain an encrypted IMSI to the first serving network; obtain the encrypted IMSI according to a response message of the request message; decrypt the encrypted IMSI, feed back an authentication response message to the first serving network, wherein the authentication response message carries a user security context, and the user security context is used for performing network access authentication on the user equipment.

Figure 11:
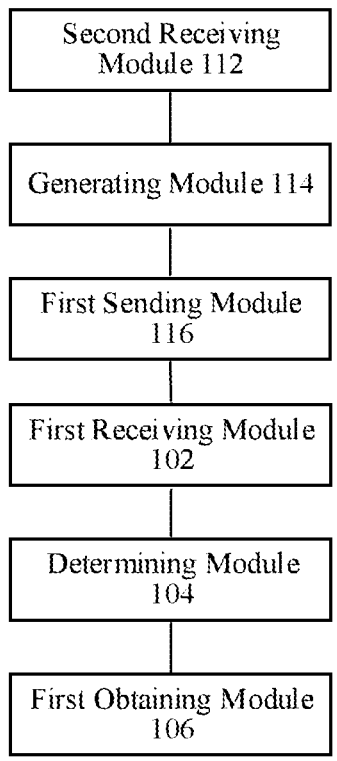
FIG. 11 is a first block diagram of a preferred structure of a network access authentication device according to an embodiment of the present disclosure.

FIG. 11 is a first block diagram of a preferred structure of a network access authentication device according to an embodiment of the present disclosure. As shown in FIG. 11, in addition to all the modules shown in FIG. 10, the device further includes:

a second receiving module 112 configured to receive an encrypted IMSI sent by a second serving network;

a generating module 114 connected to the second receiving module 112, and configured to: after it is determined that the user equipment corresponding to the encrypted IMSI is valid, generate an alias index corresponding to a user equipment alias identifier to be used; and a first sending module 116 connected to the generating module 114, and configured to send the alias index to the second serving network, so as to notify the user equipment to generate a user equipment alias identifier according to the alias index.

Figure 12:
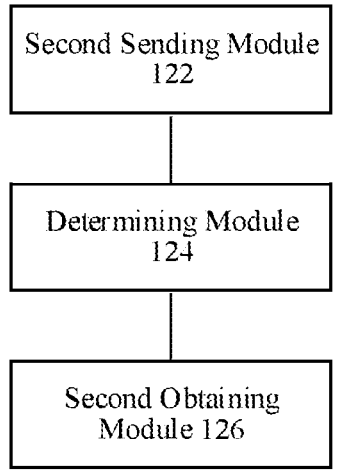
FIG. 12 is a second structural block diagram of a network access authentication device according to an embodiment of the present disclosure.

FIG. 12 is a second structural block diagram of a network access authentication device according to an embodiment of the present disclosure. As shown in FIG. 12, the device includes:

a second sending module 122 configured to send an authentication request message to the home network, the authentication request message carrying a user equipment alias identifier generated by the user equipment;

a determining module 124 connected to the second sending module 122, and configured to determine, according to a feedback of the home network, that a user equipment alias identifier in the home network is asynchronous with the user equipment alias identifier generated by the user equipment;

a second obtaining module 126 connected to the determining module 124, and configured to obtain an encrypted International Mobile Subscriber Identification Number IMSI, and send the encrypted IMSI to the home network, so that the home network performs network access authentication on the user equipment.

In an embodiment of the present disclosure, the second obtaining module is further configured to receive a first authentication failure message sent by the home network, wherein the first authentication failure message carries a reason value for the asynchronousness of the user equipment alias identifier; and send an attach failure message carrying the reason value for the asynchronousness of the user equipment alias identifier to the user equipment, to notify the user equipment to resend an attach request carrying an encrypted IMSI to the first serving network according to the reason value for the asynchronousness of the user equipment alias identifier; obtain the encrypted IMSI according to the attach request, and send the encrypted IMSI to the home network, so that the home network performs network access authentication on the user equipment.

In an embodiment of the present disclosure, the second obtaining module is further configured to receive a second authentication failure message sent by the home network; send a user equipment identifier request message to the user equipment according to the second authentication failure message; and obtain the encrypted IMSI according to a response of the user equipment, resend an authentication request message carrying the encrypted IMSI to the home network, so that the home network performs network access authentication on the user equipment.

In an embodiment of the present disclosure, the second obtaining module is further configured to receive a request message to obtain an encrypted IMSI sent by the home network; send a user equipment identifier request message to the user equipment according to the request message; obtain the encrypted IMSI according to a response of the user equipment, and send the encrypted IMSI to the home network, so that the home network performs network access authentication on the user equipment.

Figure 13:
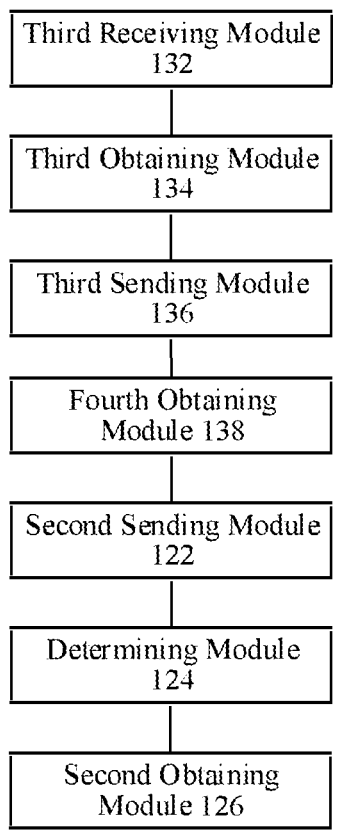
FIG. 13 is a second block diagram of a preferred structure of a network access authentication device according to an embodiment of the present disclosure.

FIG. 13 is a second block diagram of a preferred structure of a network access authentication device according to an embodiment of the present disclosure. As shown in FIG. 13, in addition to all the modules shown in FIG. 12, the device further includes:

a third receiving module 132 configured to receive an attach request sent by the user equipment, the attach request carrying a temporary identifier;

a third obtaining module 134 connected to the third receiving module 132, and configured to obtain a user security context from a second serving network according to the temporary identifier;

a third sending module 136 connected to the third obtaining module 134, and configured to send a request message for obtaining the encrypted IMSI or a user equipment alias identifier to the user equipment if obtaining of the user security context fails;

a fourth obtaining module 138 connected to the third sending module 136, and configured to obtain the encrypted IMSI or the user equipment alias identifier according to the message, for performing network access authentication on the user equipment.

It should be noted that each of the above modules may be implemented by software or hardware. For the latter, the foregoing may be implemented by, but not limited to that the above modules are all located in the same processor; or, the above modules are located in different processors in any combination forms.

Third Embodiment

An embodiment of the present disclosure also provides a storage medium. In this embodiment, the above storage medium may be configured to store program codes for performing the following steps.

In S1, an authentication request message sent by a first serving network is received, the authentication request message carrying a user equipment alias identifier generated by user equipment.

In S2, whether a local user equipment alias identifier is asynchronous with the user equipment alias identifier generated by the user equipment is determined.

In S3, if the determination result is positive, an encrypted International Mobile Subscriber Identification Number IMSI is obtained for performing network access authentication on the user equipment.

In an embodiment of the present disclosure, the storage medium is further configured to store program codes for performing the following steps:

Obtaining an encrypted IMSI for performing network access authentication on the user equipment includes:

S1, sending a first authentication failure message to the first serving network, wherein the first authentication failure message carries a reason value for the asynchronousness of the user equipment alias identifier, and the reason value for the asynchronousness of the user equipment alias identifier is used for notifying the user equipment to resend an attach request carrying an encrypted IMSI to the first serving network according to the reason value for the asynchronousness of the user equipment alias identifier; and S2, obtaining the encrypted IMSI according to the attach request, for performing network access authentication on the user equipment.

In an embodiment of the present disclosure, the storage medium is further configured to store program codes for performing the following steps:

Obtaining an encrypted IMSI for performing network access authentication on the user equipment includes:

S1, sending a second authentication failure message to the first serving network;

S2, receiving an authentication request message carrying the encrypted IMSI re-sent by the first serving network according to the second authentication failure message; and S3, obtaining the encrypted IMSI according to the authentication request message, for performing network access authentication on the user equipment.

In an embodiment of the present disclosure, the storage medium is further configured to store program codes for performing the following steps:

Obtaining an encrypted IMSI for performing network access authentication on the user equipment includes:

S1, sending a request message to obtain an encrypted IMSI to the first serving network;

S2, obtaining the encrypted IMSI according to a response message of the request message; and S3, decrypting the encrypted IMSI, and feeding back an authentication response message to the first serving network, wherein the authentication response message carries a user security context, and the user security context is used for performing network access authentication on the user equipment.

In an embodiment of the present disclosure, the storage medium is further configured to store program codes for performing the following steps:

Before the authentication request message sent by the first serving network is received, the method further includes:

S1, receiving an encrypted IMSI sent by a second serving network;

S2, after it is determined that the user equipment corresponding to the encrypted IMSI is valid, generating an alias index corresponding to a user equipment alias identifier to be used; and S3, sending the alias index to the second serving network, so as to notify the user equipment to generate a user equipment alias identifier according to the alias index.

An embodiment of the present disclosure also provides a storage medium. In this embodiment, the above storage medium may be configured to store program codes for performing the following steps.

In S1, an authentication request message is sent to the home network, the authentication request message carrying a user equipment alias identifier generated by the user equipment.

In S2, according to a feedback of the home network, it is determined that the user equipment alias identifier in the home network is asynchronous with the user equipment alias identifier generated by the user equipment; and In S3, an encrypted International Mobile Subscriber Identification Number IMSI is obtained, and the encrypted IMSI to the home network is sent, so that the home network performs network access authentication on the user equipment.

In an embodiment of the present disclosure, the storage medium is further configured to store program codes for performing the following steps:

Obtaining an encrypted IMSI and sending the encrypted IMSI to the home network, so that the home network performs network access authentication on the user equipment includes:

S1, receiving a first authentication failure message sent by the home network, wherein the first authentication failure message carries a reason value for the asynchronousness of the user equipment alias identifier;

S2, sending an attach failure message carrying the reason value for the asynchronousness of the user equipment alias identifier to the user equipment, to notify the user equipment to resend an attach request carrying an encrypted IMSI to the first serving network according to the reason value for the asynchronousness of the user equipment alias identifier; and S3, obtaining the encrypted IMSI according to the attach request, and sending the encrypted IMSI to the home network, so that the home network performs network access authentication on the user equipment.

In an embodiment of the present disclosure, the storage medium is further configured to store program codes for performing the following steps:

Obtaining an encrypted IMSI and sending the encrypted IMSI to the home network, so that the home network performs network access authentication on the user equipment includes:

S1, receiving a second authentication failure message sent by the home network;

S2, sending a user equipment identifier request message to the user equipment according to the second authentication failure message; and S3: obtaining the encrypted IMSI according to a response of the user equipment, resending an authentication request message carrying the encrypted IMSI to the home network, so that the home network performs network access authentication on the user equipment.

In an embodiment of the present disclosure, the storage medium is further configured to store program codes for performing the following steps:

Obtaining an encrypted IMSI and sending the encrypted IMSI to the home network, so that the home network performs network access authentication on the user equipment includes:

S1, receiving a request message to obtain an encrypted IMSI sent by the home network;

S2, sending a user equipment identifier request message to the user equipment according to the request message; and S3, obtaining the encrypted IMSI according to a response of the user equipment, and sending the encrypted IMSI to the home network, so that the home network performs network access authentication on the user equipment.

In an embodiment of the present disclosure, the storage medium is further configured to store program codes for performing the following steps:

Before an authentication request message to the home network is sent, the method includes:

S1, receiving an attach request sent by the user equipment, the attach request carrying a temporary identifier;

S2, obtaining a user security context from a second serving network according to the temporary identifier;

S3, sending a request message for obtaining the encrypted IMSI or a user equipment alias identifier to the user equipment if obtaining of the user security context fails; and S4, obtaining the encrypted IMSI or the user equipment alias identifier according to the message, for performing network access authentication on the user equipment.

Optionally, in an embodiment, the above storage medium may include, but is not limited to, a USB flash drive, a Read-Only Memory (ROM), a Random Access Memory (RAM), a mobile hard disk, a magnetic disc, an optical disc and a variety of media that can store program codes.

Optionally, in an embodiment, a processor executes according to the stored program codes in the storage medium: receiving an authentication request message sent by a first serving network, the authentication request message carrying a user equipment alias identifier generated by user equipment; determining whether a local user equipment alias identifier is asynchronous with the user equipment alias identifier generated by the user equipment; and if the determination result is negative, obtaining an encrypted International Mobile Subscriber Identification Number IMSI for performing network access authentication on the user equipment.

Optionally, in an embodiment, the processor executes the following steps according to the stored program codes in the storage medium: obtaining an encrypted IMSI for performing network access authentication on the user equipment includes: sending a first authentication failure message to the first serving network, wherein the first authentication failure message carries a reason value for the asynchronousness of the user equipment alias identifier, and the reason value for the asynchronousness of the user equipment alias identifier is used for notifying the user equipment to resend an attach request carrying an encrypted IMSI to the first serving network according to the reason value for the asynchronousness of the user equipment alias identifier; and obtaining the encrypted IMSI according to the attach request, for performing network access authentication on the user equipment.

Optionally, in an embodiment, the processor executes the following steps according to the stored program codes in the storage medium: obtaining an encrypted IMSI for performing network access authentication on the user equipment includes: sending a second authentication failure message to the first serving network; receiving an authentication request message carrying the encrypted IMSI re-sent by the first serving network according to the second authentication failure message; and obtaining the encrypted IMSI according to the authentication request message, for performing network access authentication on the user equipment.

Optionally, in an embodiment, the processor executes according to the stored program codes in the storage medium: obtaining an encrypted IMSI for performing network access authentication on the user equipment includes: sending a request message to obtain an encrypted IMSI to the first serving network; obtaining the encrypted IMSI according to a response message of the request message; decrypting the encrypted IMSI, feeding back an authentication response message to the first serving network, wherein the authentication response message carries a user security context, and the user security context is used for performing network access authentication on the user equipment.

Optionally, in an embodiment, the processor executes the following steps according to the stored program codes in the storage medium: before the authentication request message sent by the first serving network is received, the method further includes: receiving an encrypted IMSI sent by a second serving network; after it is determined that the user equipment corresponding to the encrypted IMSI is valid, generating an alias index corresponding to a user equipment alias identifier to be used; and sending the alias index to the second serving network, so as to notify the user equipment to generate a user equipment alias identifier according to the alias index.

Optionally, in an embodiment, the processor executes the following steps according to the stored program codes in the storage medium: sending an authentication request message to the home network, the authentication request message carrying a user equipment alias identifier generated by the user equipment; according to a feedback of the home network, determining that the user equipment alias identifier in the home network is asynchronous with the user equipment alias identifier generated by the user equipment; and obtaining an encrypted International Mobile Subscriber Identification Number IMSI, and sending the encrypted IMSI to the home network, so that the home network performs network access authentication on the user equipment.

Optionally, in this embodiment, the processor executes the following steps according to the stored program codes in the storage medium: obtaining an encrypted IMSI and sending the encrypted IMSI to the home network, so that the home network performs network access authentication on the user equipment includes: receiving a first authentication failure message sent by the home network, wherein the first authentication failure message carries a reason value for the asynchronousness of the user equipment alias identifier; sending an attach failure message carrying the reason value for the asynchronousness of the user equipment alias identifier to the user equipment, to notify the user equipment to resend an attach request carrying an encrypted IMSI to the first serving network according to the reason value for the asynchronousness of the user equipment alias identifier; and obtaining the encrypted IMSI according to the attach request, and sending the encrypted IMSI to the home network, so that the home network performs network access authentication on the user equipment.

Optionally, in an embodiment, the processor executes the following steps according to the stored program codes in the storage medium: obtaining an encrypted IMSI and sending the encrypted IMSI to the home network, so that the home network performs network access authentication on the user equipment includes: receiving a second authentication failure message sent by the home network; sending a user equipment identifier request message to the user equipment according to the second authentication failure message; obtaining the encrypted IMSI according to a response of the user equipment, resending an authentication request message carrying the encrypted IMSI to the home network, so that the home network performs network access authentication on the user equipment.

Optionally, in this embodiment, the processor executes the following steps according to the stored program codes in the storage medium: obtaining an encrypted IMSI and sending the encrypted IMSI to the home network, so that the home network performs network access authentication on the user equipment includes: receiving a request message to obtain an encrypted IMSI sent by the home network; sending a user equipment identifier request message to the user equipment according to the request message; obtaining the encrypted IMSI according to a response of the user equipment, and sending the encrypted IMSI to the home network, so that the home network performs network access authentication on the user equipment.

Optionally, in this embodiment, the processor executes the following steps according to the stored program codes in the storage medium: before an authentication request message to the home network is sent, the method includes: receiving an attach request sent by the user equipment, the attach request carrying a temporary identifier; obtaining a user security context from a second serving network according to the temporary identifier; sending a request message for obtaining the encrypted IMSI or a user equipment alias identifier to the user equipment if obtaining of the user security context fails; and obtaining the encrypted IMSI or the user equipment alias identifier according to the message to perform network access authentication on the user equipment.

For example, the specific examples in the embodiments may refer to the examples described in the above embodiments and the optional implementations, details of which will not be repeated herein.

Apparently, those skilled in the art should understand that the above modules or steps of the embodiments of the present disclosure can be implemented by a general computing device, which can be concentrated on a single computing device or distributed in a network of plurality of computing devices. Alternatively, they may be implemented by program codes executable by the computing device so that they can be stored in the storage device and executed by the computing device. In some cases, the steps shown or described may be performed in an order different from that is described herein.

Alternatively, they may be fabricated into individual integrated circuit modules, or a plurality of modules or steps may be fabricated into a single integrated circuit module. Thus, embodiments of the present disclosure are not limited to any specific combination of hardware and software.

The above is only the exemplary embodiments of the present disclosure, and is not intended to limit the embodiments of the present disclosure. Various modifications and changes can be made to the embodiments of the present disclosure by those skilled in the art. Any modifications, equivalent substitutions, improvements, etc. within the spirit and scope of the present disclosure are intended to be included within the scope of the present disclosure.

INDUSTRIAL APPLICABILITY

In the network access authentication method provided by the embodiments of the present disclosure, when the local user equipment alias identifier is asynchronous with the user equipment alias identifier generated by the user equipment, an encrypted International Mobile Subscriber Identification Number IMSI is obtained for performing network access authentication on the user equipment. Thus, embodiments of the present disclosure can solve the problem that the network access process of the related art does not define how to proceed when the user equipment alias identifier in the user equipment is asynchronous with the user equipment alias identifier in the home network.

What is claimed is:

1. A method for wireless communication, comprising:
receiving, by a second serving network, an attach request originated from a user equipment, the attach request carrying a temporary identifier;
transmitting, by the second serving network, a request message to a first serving network that previously served the user equipment to obtain a user context from the first serving network according to the temporary identifier carried in the attach request;
receiving, by the second serving network, a response message from the first serving network indicating a failure by the first serving network in retrieving the user context caused by the first serving network not being able to find the user context;
transmitting, by the second serving network in response to the response message indicating the failure of the first serving network, an identity request message to the user equipment, wherein the identity request message includes an identity type indicating that an encrypted subscription identity is requested; and
receiving, by the second serving network in response to the transmitting the identity request message to the user equipment, an identity response from the user equipment including the encrypted subscription identity,
the method further comprising:
receiving, by the second serving network, a second attach request originated from a second user equipment, the second attach request carrying a second encrypted subscription identity;
transmitting, by the second serving network, an authentication request message to a home network, wherein the authentication request message includes the second encrypted subscription identity, and wherein the home network is determined based on a Mobile Country Code, MCC, and a Mobile Network Node, MNC, carried in the second encrypted subscription identity; and
receiving, by the second serving network, an authentication response message from the home network, the authentication response message comprising a decrypted subscription identity.

2. The method of claim 1, wherein the encrypted subscription identity is determined by the user equipment using a public key.

3. The method of claim 1, wherein the second encrypted subscription identity is determined by the second user equipment using a second public key.

4. A device for wireless communication, comprising:
a processor; and
a memory including processor executable code, wherein the processor executable code upon execution by the processor configures the processor to:
receive an attach request originated from a user equipment, the attach request carrying a temporary identifier;
transmit a request message to a first serving network that previously served the user equipment to obtain a user context from the first serving network according to the temporary identifier carried in the attach request;
receive a response message from the first serving network indicating a failure by the first serving network in retrieving the user context caused by the first serving network not being able to find the user context;
transmit, in response to the response message indicating the failure of the first serving network, an identity request message to the user equipment, wherein the identity request message includes an identity type indicating that an encrypted subscription identity is requested; and
receive, in response to transmitting the identity request message to the user equipment, an identity response from the user equipment including the encrypted subscription identity,
wherein the processor is further configured to:
receive a second attach request originated from a second user equipment, the second attach request carrying a second encrypted subscription identity;
transmit an authentication request message to a home network, wherein the authentication request message includes the second encrypted subscription identity, and wherein the home network is determined based on a Mobile Country Code, MCC, and a Mobile Network Node, MNC, carried in the second encrypted subscription identity; and
receive an authentication response message from the home network, the authentication response message comprising a decrypted subscription identity.

5. The device of claim 4, wherein the encrypted subscription identity is determined by the user equipment using a public key.

6. The device of claim 4, wherein the second encrypted subscription identity is determined by the second user equipment using a second public key.

7. A non-transitory storage medium having code stored thereon, the code upon execution by a processor, causing the processor to implement a method that comprises:
   receiving, by a second serving network, an attach request originated from a user equipment, the attach request carrying a temporary identifier;
   transmitting, by the second serving network, a request message to a first serving network that previously served the user equipment to obtain a user context from the first serving network according to the temporary identifier carried in the attach request;
   receiving, by the second serving network, a response message from the first serving network indicating a failure by the first serving network in retrieving the user context caused by the first serving network not being able to find the user context;
   transmitting, by the second serving network in response to the response message indicating the failure of the first serving network, an identity request message to the user equipment, wherein the identity request message includes an identity type indicating that an encrypted subscription identity is requested; and
   receiving, by the second serving network in response to the transmitting the identity request message to the user equipment, an identity response from the user equipment including the encrypted subscription identity,
wherein the method further comprises:
   receiving, by the second serving network, a second attach request originated from a second user equipment, the second attach request carrying a second encrypted subscription identity;
   transmitting, by the second serving network, an authentication request message to a home network, wherein the authentication request message includes the second encrypted subscription identity, and wherein the home network is determined based on a Mobile Country Code, MCC, and a Mobile Network Node, MNC, carried in the second encrypted subscription identity; and
   receiving, by the second serving network, an authentication response message from the home network, the authentication response message comprising a decrypted subscription identity.

8. The non-transitory storage medium of claim 7, wherein the encrypted subscription identity is determined by the user equipment using a public key.

9. The non-transitory storage medium of claim 7, wherein the second encrypted subscription identity is determined by the second user equipment using a second public key.

* * * * *